United States Patent
Harada et al.

(10) Patent No.: US 9,874,173 B2
(45) Date of Patent: Jan. 23, 2018

(54) CONTROL DEVICE FOR DIRECT INJECTION GASOLINE ENGINE

(71) Applicant: MAZDA MOTOR CORPORATION, Hiroshima (JP)

(72) Inventors: Yuji Harada, Higashihiroshima (JP); Hiroyuki Yamashita, Hiroshima (JP); Masahiko Fujimoto, Hiroshima (JP); Masatoshi Seto, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/029,673

(22) PCT Filed: Feb. 2, 2015

(86) PCT No.: PCT/JP2015/000440
§ 371 (c)(1),
(2) Date: Apr. 15, 2016

(87) PCT Pub. No.: WO2015/115115
PCT Pub. Date: Aug. 6, 2015

(65) Prior Publication Data
US 2016/0252041 A1    Sep. 1, 2016

(30) Foreign Application Priority Data

Feb. 3, 2014   (JP) .................................. 2014-018174

(51) Int. Cl.
*F02D 41/40* (2006.01)
*F02D 35/02* (2006.01)
(Continued)

(52) U.S. Cl.
CPC .......... *F02D 41/402* (2013.01); *F02B 23/101* (2013.01); *F02D 35/025* (2013.01);
(Continued)

(58) Field of Classification Search
CPC ................. F02D 41/402; F02D 41/405; F02D 2041/389; F02B 23/101; F02B 2023/103;
(Continued)

(56) References Cited

U.S. PATENT DOCUMENTS

| 7,168,412 B2 | 1/2007 | Cooke et al. |
| 2003/0051692 A1* | 3/2003 | Mizutani ............... F02D 11/105 |
| | | 123/179.15 |

(Continued)

FOREIGN PATENT DOCUMENTS

| JP | 2003-106186 A | 4/2003 |
| JP | 2004-301080 A | 10/2004 |

(Continued)

OTHER PUBLICATIONS

International Search Report and Written Opinion issued in Application No. PCT/JP2015/000440, dated Apr. 21, 2015.

*Primary Examiner* — John Kwon
*Assistant Examiner* — Johnny H Hoang
(74) *Attorney, Agent, or Firm* — Studebaker & Brackett PC

(57) ABSTRACT

An engine has an engine body, an injector, and a control section which controls a fuel injection amount and an injection state of the injector. The control section predicts a state of temperature in the combustion chamber, and controls the injector such that a volume of an air-fuel mixture layer formed in the combustion chamber is larger when the predicted temperature is high, than when the predicted temperature is low, even when same fuel amounts are injected.

25 Claims, 12 Drawing Sheets

(51) Int. Cl.
*F02M 61/18* (2006.01)
*F02B 23/10* (2006.01)
*F02D 41/38* (2006.01)

(52) U.S. Cl.
CPC ....... *F02D 41/405* (2013.01); *F02M 61/1806* (2013.01); *F02B 2023/103* (2013.01); *F02D 2041/389* (2013.01); *F02M 61/1886* (2013.01); *Y02T 10/125* (2013.01); *Y02T 10/44* (2013.01)

(58) Field of Classification Search
CPC ............ F02M 61/1806; F02M 61/1886; Y02T 10/125; Y02T 10/44
USPC ................... 123/299, 300–305, 435, 406.26; 701/103, 104
See application file for complete search history.

(56) References Cited

U.S. PATENT DOCUMENTS

| | | | | |
|---|---|---|---|---|
| 2004/0007209 | A1* | 1/2004 | Ohtani | F02D 41/062 123/431 |
| 2004/0129245 | A1* | 7/2004 | Hitomi | F01L 1/267 123/299 |
| 2004/0187480 | A1* | 9/2004 | Bidner | F01N 3/0814 60/285 |
| 2004/0216714 | A1* | 11/2004 | Tayama | F02B 23/101 123/276 |
| 2004/0261761 | A1* | 12/2004 | Hayakawa | F02M 51/0671 123/295 |
| 2006/0054137 | A1* | 3/2006 | Tokuda | F02D 41/061 123/431 |
| 2006/0207240 | A1* | 9/2006 | Araki | F02D 37/02 60/284 |
| 2007/0215095 | A1* | 9/2007 | Kakuya | F02D 37/02 123/295 |
| 2009/0133668 | A1 | 5/2009 | Ashizawa | |
| 2011/0259290 | A1* | 10/2011 | Michikawauchi | F02M 25/14 123/1 A |
| 2013/0080030 | A1* | 3/2013 | Chi | F02D 41/401 701/103 |
| 2016/0053700 | A1* | 2/2016 | Thomas | F02D 41/1446 123/435 |

FOREIGN PATENT DOCUMENTS

| | | |
|---|---|---|
| JP | 2006-170167 A | 6/2006 |
| JP | 2008-038740 A | 2/2008 |
| JP | 2008-151043 A | 7/2008 |
| JP | 4194564 B2 | 12/2008 |
| JP | 2009-243355 A | 10/2009 |
| JP | 2013-057266 A | 3/2013 |

* cited by examiner

FIG.8(A) LONG INJECTION INTERVAL
FIG.8(B) SHORT INJECTION INTERVAL
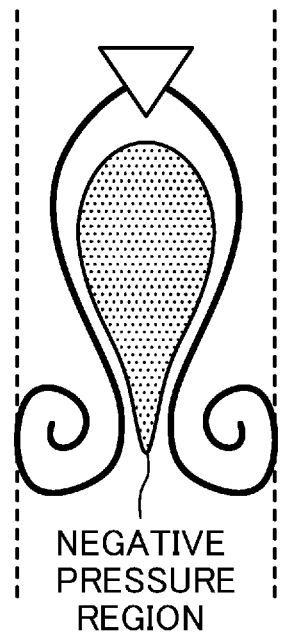

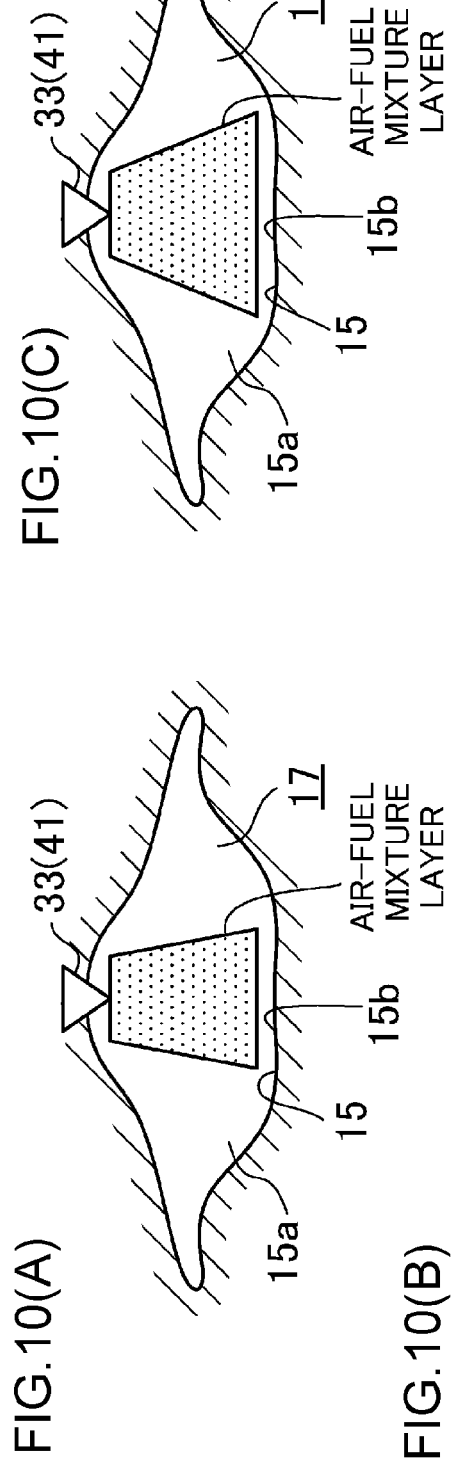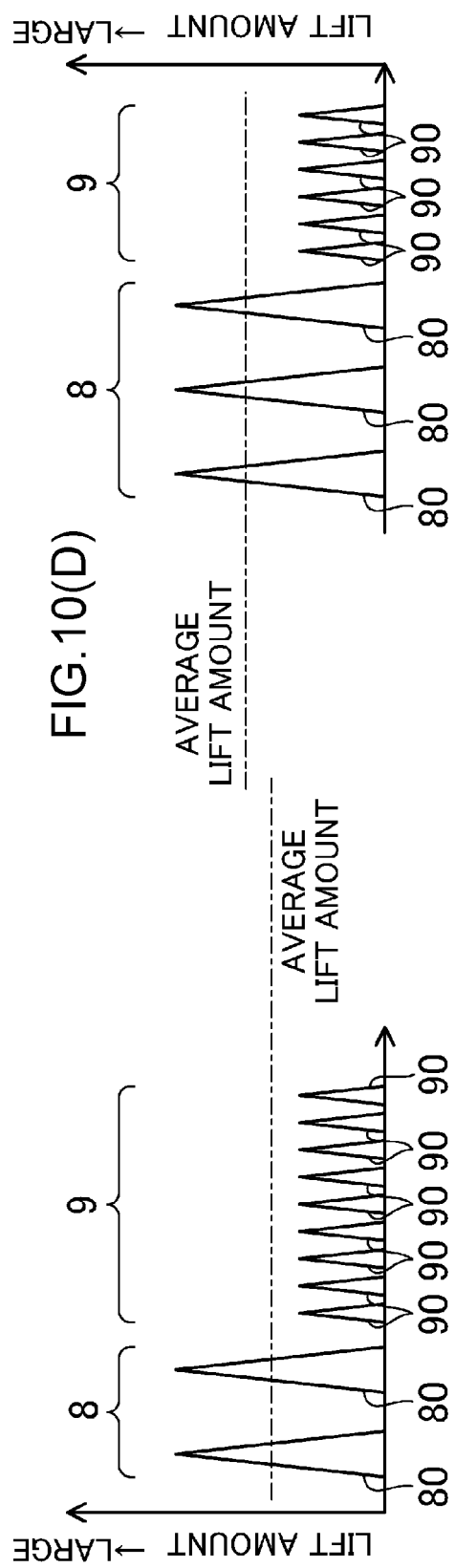

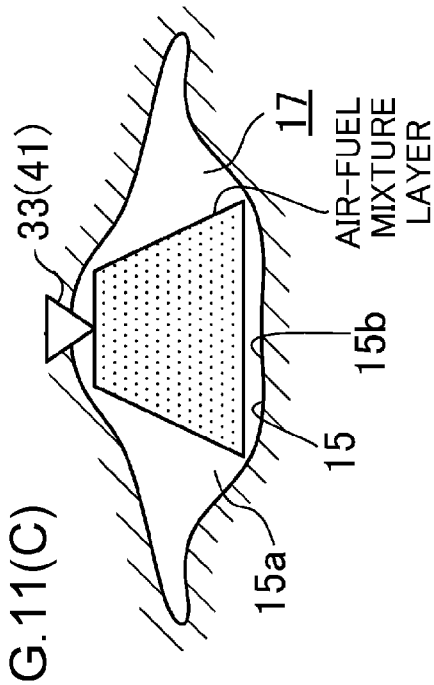
FIG.11(A)
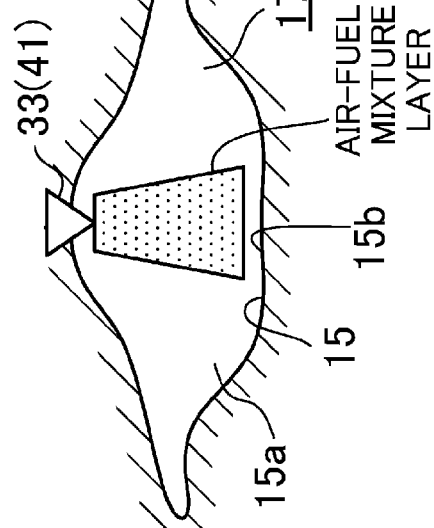
FIG.11(C)
FIG.11(B)
FIG.11(D)

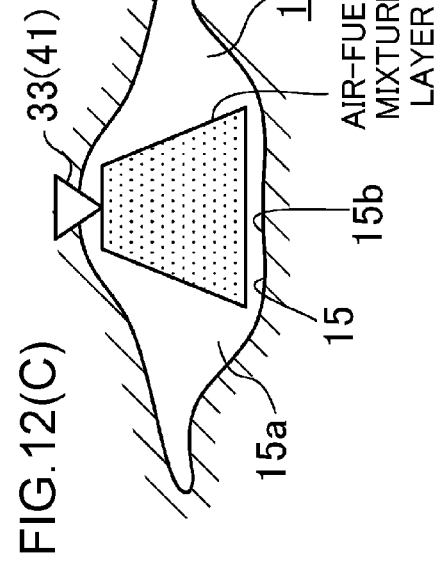
FIG.12(A)
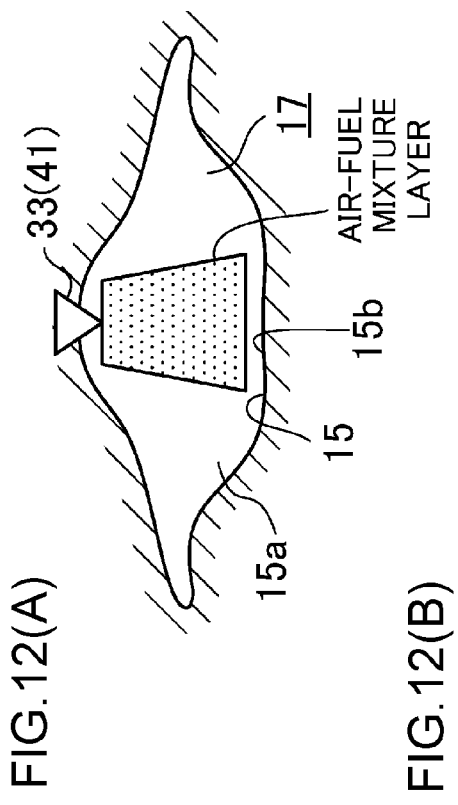
FIG.12(C)
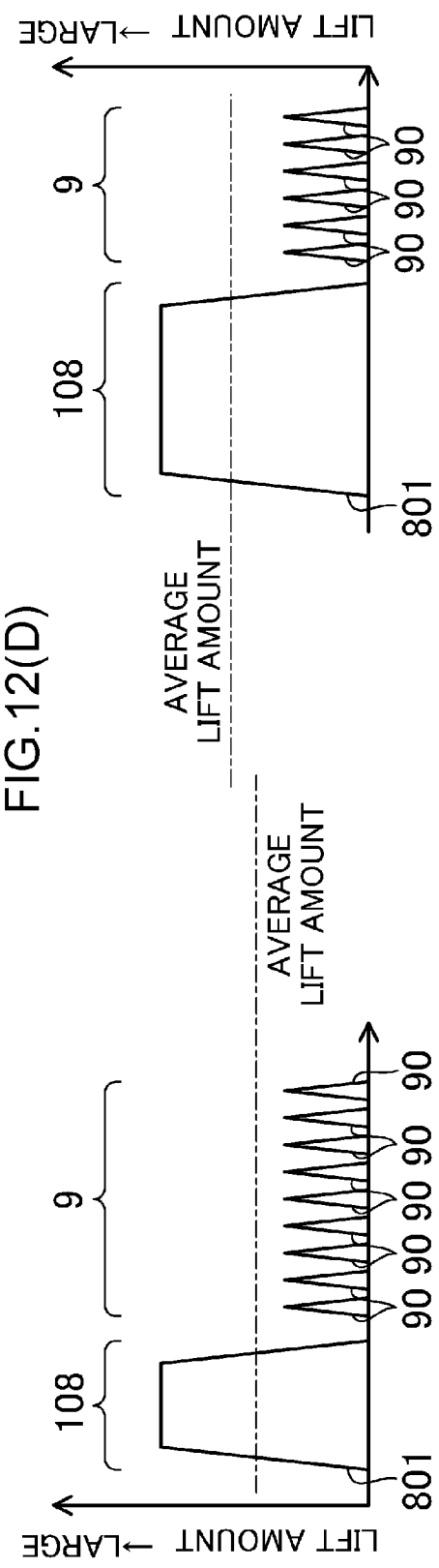
FIG.12(B)
FIG.12(D)

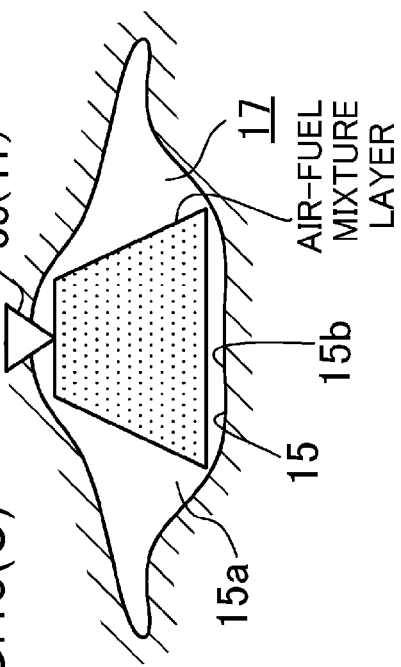
FIG.13(A)
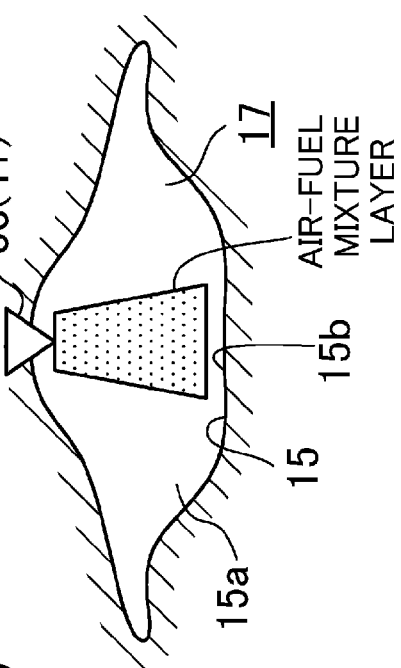
FIG.13(C)
FIG.13(B)
FIG.13(D)

CONTROL DEVICE FOR DIRECT INJECTION GASOLINE ENGINE

TECHNICAL FIELD

The present disclosure relates to a device for controlling a direct injection gasoline engine.

BACKGROUND ART

Patent Document 1 discloses a compression self-ignition engine in which a wall surface dividing the combustion chamber is made of a heat-insulating material to reduce cooling loss by the wall surface of the combustion chamber. A reduction in the cooling loss improves thermal efficiency.

Patent Document 2 discloses an outwardly-opening valve injector for injecting the fuel into the combustion chamber of an engine. In the outwardly-opening valve injector, the effective cross-sectional area of a nozzle port, through which the fuel is injected, is changed by changing a lift amount of a valve body. Further, Patent Document 3 discloses a valve covered orifice (VCO) nozzle type injector. The VCO nozzle type injector is configured such that a needle valve is set directly on the seat portion where the nozzle port is open, and that the nozzle port is closed by that needle valve. In the VCO nozzle type injector, the size of a cavitation area, which is generated on the inner periphery of the nozzle port, varies according to the lift amount of the needle valve. Thus, in the VCO nozzle type injector, the effective cross-sectional area of the nozzle port changes according to the lift amount of the needle valve, similarly to the outwardly-opening valve injector.

Patent Document 4 discloses an engine having an outwardly-opening valve injector arranged on the central axis of the cylinder, and injecting the fuel in the form of a cone, wherein the fuel is injected into the cylinder in the second half of a compression stroke, thereby forming, in the combustion chamber, an air-fuel mixture layer and a gas layer (a gas layer containing fresh air) around the air-fuel mixture layer. The engine disclosed in Patent Document 4 reduces the cooling loss by making the gas layer around the air-fuel mixture layer serve as a heat-insulating layer at the combustion of the air-fuel mixture. Patent Document 4 also discloses making the fuel concentration uniform with respect to the fuel injection direction by changing the lift amount of the outwardly-opening valve in the middle of a continuous injection of the fuel.

CITATION LIST

Patent Document

Patent Document 1: Japanese Unexamined Patent Publication No. 2009-243355
Patent Document 2: Japanese Unexamined Patent Publication No. 2008-151043
Patent Document 3: Japanese Patent No. 4194564
Patent Document 4: Japanese Unexamined Patent Publication No. 2013-57266

SUMMARY OF THE INVENTION

Technical Problem

Here, the combustion temperature needs to be in a predetermined range (e.g., 1500 to 1800 K) to reduce the emission of NOx and unburned substances. That is, if the combustion temperature is too low, the amount of unburned substances are increased, and hence the emission thereof is also increased, whereas if the combustion temperature is too high, NOx is generated, and hence the emission thereof is increased.

When the intake air temperature is low, or when the temperature of the inner wall surface of the cylinder is low, the state of temperature in the cylinder is low. If the state of temperature in the cylinder, more accurately, the temperature in the cylinder when the piston reaches the compression top dead center (hereinafter this temperature may sometimes be called a compression end temperature) is low, the combustion stability is lowered, and the amount of emission of unburned substances is increased. To raise the combustion temperature, the amount of intake air to be introduced into the cylinder may be reduced, for example, by setting the timing of closing of the intake valve to be later than when the piston reaches the bottom dead center in the intake stroke. However, the delayed closing of the intake valve reduces an effective compression ratio, and it is therefore disadvantageous in terms of thermal efficiency.

Further, when the intake air temperature is high, or when the temperature of the inner wall surface of the cylinder is high, the state of temperature in the cylinder is high. This increases the combustion temperature, and leads to the generation of NOx. To lower the combustion temperature, cooled exhaust gas may be introduced into the cylinder. However, the return of the exhaust gas lowers the specific-heat ratio of the gas in the cylinder, and it is therefore disadvantageous in terms of thermal efficiency.

In this manner, an attempt to bring the combustion temperature within a predetermined temperature range in order to keep the exhaust gas emission performance satisfactory, may cause the combustion temperature to fall outside the predetermined temperature range, depending on the intake air temperature or the state of temperature of the inner wall surface of the cylinder. A technique is therefore demanded for controlling the combustion temperature without a reduction in the thermal efficiency.

In view of the foregoing, it is therefore an object of present disclosure to enable control of a combustion temperature without a reduction in the thermal efficiency.

Solution to the Problem

The techniques disclosed herein are directed to a device for controlling a direct injection gasoline engine. The device includes: an engine body which has a piston in a cylinder and of which a combustion chamber is defined by the cylinder and the piston; an injector configured to inject a fuel containing at least gasoline into the combustion chamber through a nozzle hole; and a control section configured to control a fuel injection amount to be injected into the combustion chamber, and an injection state of the injector, according to an operational state of the engine body.

The control section predicts a state of temperature in the combustion chamber, and controls the injection state of the injector such that a volume of an air-fuel mixture layer formed in the combustion chamber is larger when the predicted temperature is high, than when the predicted temperature is low, even when same fuel amounts are injected.

The air-fuel mixture layer is a layer of a combustible air-fuel mixture formed in the combustion chamber. The combustible air-fuel mixture may also be defined, for example, as an air-fuel mixture with an equivalence ratio φ of more than or equal to 0.1. Further, the fuel spray spreads with time after the start of the fuel injection. Thus, the size of the air-fuel mixture layer may be the size at the time of ignition. It is therefore possible to define a space in the combustion chamber where the equivalence ratio φ is more than or equal to 0.1 at the time of ignition, as the air-fuel mixture layer. Moreover, the ignition is considered as ignition when, for example, a fuel combustion mass ratio turns to 1% or more.

The injection state of the injector is related to changing at least one of the particle size of the fuel to be injected or the injection interval, as will be described later.

The prediction of the state of temperature in the combustion chamber may be the prediction of the compression end temperature. For example, the compression end temperature may be predicted from, but is not limited to, all parameters such as an outdoor temperature, an oil temperature, a water temperature, an amount of intake air charge, and an amount of exhaust gas recirculation, or some of the parameters selected arbitrarily.

When the fuel injection amounts are the same, a larger volume of the air-fuel mixture layer leads to a lower fuel density of the air-fuel mixture layer, compared to a smaller volume of the air-fuel mixture layer. The reduced fuel density of the air-fuel mixture layer leads to a reduction in the combustion temperature at which the air-fuel mixture layer burns. On the other hand, a smaller volume of the air-fuel mixture layer leads to a higher fuel density of the air-fuel mixture layer, compared to a larger volume of the air-fuel mixture layer. The increased fuel density of the air-fuel mixture layer leads to an increase in the combustion temperature at which the air-fuel mixture layer burns.

Increasing the volume of the air-fuel mixture layer, thereby decreasing the combustion temperature, when it is predicted that the state of temperature in the combustion chamber will rise, allows the combustion temperature to fall within a predetermined temperature range that ensures good exhaust gas emission performance. On the other hand, reducing the volume of the air-fuel mixture layer, thereby increasing the combustion temperature, when it is predicted that the state of temperature in the combustion chamber will drop, allows the combustion temperature to fall within a predetermined temperature range that ensures good exhaust gas emission performance. Accordingly, the above configurations allow for maintaining good exhaust gas emission performance by making the combustion temperature fall within a desired temperature range according to the intake air temperature and the state of temperature of the inner wall surfaces of the cylinder.

Further, the above configurations control the combustion temperature by controlling the volume of the air-fuel mixture formed in the combustion chamber. This prevents the necessity to reduce the amount of intake air charge, or to increase the amount of recirculation of cooled exhaust gas. In other words, the combustion temperature can be controlled without degradation in the thermal efficiency of the engine.

The control section may control the injection state of the injector to increase the volume of the air-fuel mixture layer by increasing a width, which extends in a radial direction and intersects with a central axis of the cylinder, of the air-fuel mixture layer formed in the combustion chamber, while keeping a same length of the air-fuel mixture layer along the central axis of the cylinder.

The combustion chamber has a small capacity when the piston is located at the compression top dead center. In particular, an engine having a high compression ratio for improvement of the thermal efficiency has a combustion chamber whose length along the central axis of the cylinder, i.e., the distance between the lower surface of the cylinder head and the top surface of the piston, is short. By contrast, the length, extending in the radial direction and intersecting the central axis of the cylinder, of the combustion chamber (i.e., the length almost equal to a bore diameter) is relatively long with respect to the length of the combustion chamber along the central axis of the cylinder. It is therefore preferable, when increasing the volume of the air-fuel mixture layer, to increase the width, in the radial direction, of the air-fuel mixture layer while keeping the same length of the air-fuel mixture layer along the central axis of the cylinder. This allows for increasing the volume of the air-fuel mixture layer without bringing the air-fuel mixture layer to contact with the top surface of the piston. This is advantageous in reducing the cooling loss.

The injector may have a nozzle body provided with the nozzle hole, and a valve element which opens and closes the nozzle hole, and the injector may be configured such that an effective cross-sectional area of the nozzle hole increases as a lift amount of the valve element increases. Examples of such an injector may include an outwardly-opening valve injector and a VCO nozzle type injector.

The control section may make the injector carry out a multi-stage injection. The multi-stage injection may include a first injection group performing fuel injections at a predetermined injection interval while setting the effective cross-sectional area of the nozzle hole at a predetermined value, and a second injection group performing fuel injections in which the effective cross-sectional area of the nozzle hole is smaller than that of the first injection group and/or the injection interval of the fuel is shorter than that of the first injection group. The control section may make the injector inject a larger amount of fuel through the first injection group, than an amount to be injected through the second injection group, when a temperature in the combustion chamber is high.

When the fuel is injected into the combustion chamber through the nozzle hole, the fuel spray jet pulls the fluid surrounding itself and takes it therein. On the other hand, the fluid is not likely to flow into a space near the nozzle hole, since the space near the nozzle hole is surrounded by the injected fuel spray. This generates a negative pressure region near the nozzle hole. When the injection interval in the multi-stage injection is long, the pressure in the negative pressure region may recover by the time when a subsequent fuel injection is carried out. Thus, the negative pressure region becomes smaller in size. When the negative pressure region is small in size, the fuel spray is not much drawn to the negative pressure, and is more likely to disperse. By contrast, when the injection interval is short, the negative pressure in the negative pressure region is maintained by the frequent fuel injections. Thus, the negative pressure region increases in size. When the negative pressure region is large in size, the fuel spray is drawn to the negative pressure, and the spread of the fuel spray is reduced. In other words, the longer the injection interval is, the more the fuel spray spreads in the combustion chamber, and the shorter the injection interval is, the less the fuel spray spreads.

A large effective cross-sectional area of the nozzle hole results in an increase in the particle size of the fuel spray to be injected into the combustion chamber through the nozzle hole. A small effective cross-sectional area of the nozzle hole results in a reduction in the particle size of the fuel spray to be injected into the combustion chamber through the nozzle hole. The momentum of the fuel spray changes with a change in the particle size. That is, a larger effective cross-sectional area of the nozzle hole leads to greater momentum of the fuel spray, thereby increasing the spreading distance of the fuel spray.

The effective cross-sectional area of the nozzle hole affects sensitivity of the fuel spray to the negative pressure region. That is, the fuel spray is less likely to be affected by the negative pressure region when the effective cross-sectional area of the nozzle hole is large, since the fuel spray has a large particle size when the effective cross-sectional area of the nozzle hole is large. The fuel spray with a large particle size is not much drawn to the negative pressure region, and a degree of deceleration of the fuel spray by the negative pressure region is small. By contrast, the fuel spray is more likely to be affected by the negative pressure region when the effective cross-sectional area of the nozzle hole is small, since the fuel spray has a small particle size when the effective cross-sectional area of the nozzle hole is small. The fuel spray with a small particle size is more likely to be drawn to the negative pressure region, and more likely to be decelerated by the negative pressure region.

The first injection group, when compared to the second injection group, has a relatively large effective cross-sectional area of the nozzle hole, and/or a relatively long injection interval, thereby forming a fuel spray having a relatively long spreading distance in the travel direction and spreading widely. In short, the first injection group is advantageous in increasing the volume of the air-fuel mixture layer.

On the other hand, the second injection group has a relatively small effective cross-sectional area of the nozzle hole, and/or a relatively short injection interval, thereby forming a fuel spray having a relatively short spreading distance in the travel direction and spreading less widely. In short, the second injection group is advantageous in reducing the volume of the air-fuel mixture layer.

Thus, when the temperature in the combustion chamber is high, the amount of fuel to be injected through the first injection group is set to be larger than the amount of fuel to be injected through the second injection group. This allows for an increase in the volume of the air-fuel mixture layer. On the other hand, when the temperature in the combustion chamber is low, the amount of fuel to be injected through the second injection group is set to be larger than the amount of fuel to be injected through the first injection group. This allows for a reduction in the volume of the air-fuel mixture layer. The volume of the air-fuel mixture layer is controllable by controlling the ratio between the amount of fuel injected through the first injection group and the amount of fuel injected through the second injection group.

The control section may be capable of switching between a first injection mode performing a plurality of fuel injections at a predetermined interval while setting the effective cross-sectional area of the nozzle hole at a predetermined value, and a second injection mode performing a plurality of fuel injections in which the effective cross-sectional area of the nozzle hole is smaller than that of the first injection mode and/or the injection interval of the fuel is shorter than that of the first injection mode, and the control section may have the injector inject the fuel through the first injection mode when the temperature in the combustion chamber is high.

The first injection mode, when compared to the second injection mode, has a relatively large effective cross-sectional area of the nozzle hole, and/or a relatively long injection interval. The first injection mode forms a fuel spray having a relatively long spreading distance in the travel direction and spreading widely. Thus, the first injection mode is advantageous in increasing the volume of the air-fuel mixture layer.

On the other hand, the second injection mode has a relatively small effective cross-sectional area of the nozzle hole, and/or a relatively short injection interval. The second injection mode forms a fuel spray having a relatively short spreading distance in the travel direction and spreading less widely. Thus, the second injection mode is advantageous in reducing the volume of the air-fuel mixture layer.

Thus, when the temperature in the combustion chamber is high, selecting the first injection mode enables increasing the volume of the air-fuel mixture layer. By contrast, when the temperature in the combustion chamber is low, selecting the second injection mode enables decreasing the volume of the air-fuel mixture layer. Further, fine control of the volume of the air-fuel mixture layer is possible by controlling, when the first injection mode is selected, the effective cross-sectional area of the nozzle hole and/or the injection interval. Similarly, fine control of the volume of the air-fuel mixture layer is possible by controlling, when the second injection mode is selected, the effective cross-sectional area of the nozzle hole and/or the injection interval.

The control section may have the injector inject the fuel during a second half of a compression stroke, through a plurality of injection modes with different effective cross-sectional areas of the nozzle hole. The plurality of injection modes may include a first injection mode in which the effective cross-sectional area of the nozzle hole is set at a predetermined value, and a second injection mode in which the effective cross-sectional area of the nozzle hole is set at a smaller value than the predetermined value. The control section may have the injector inject a larger amount of fuel through the first injection mode, than an amount to be injected through the second injection mode, when a temperature in the combustion chamber is high.

The second half of the compression stroke may be defined as the latter half of a compression stroke period divided into two equal periods.

A large effective cross-sectional area of the nozzle hole results in an increase in the particle size of the fuel spray injected into the combustion chamber through the nozzle hole. A small effective cross-sectional area of the nozzle hole results in a reduction in the particle size of the fuel spray injected into the combustion chamber through the nozzle hole. The momentum of the fuel spray changes with a change in the particle size. That is, a larger effective cross-sectional area of the nozzle hole leads to greater momentum of the fuel spray, thereby increasing the spreading distance of the fuel spray.

Further, since the fuel is injected in the second half of the compression stroke in which the pressure in the cylinder is relatively high (i.e., the gas density in the cylinder is high), the fuel spray is subjected to large drag force, and the momentum of the flying fuel spray is likely to be attenuated.

Thus, when the effective cross-sectional area of the nozzle hole is small and the particle size of the fuel spray is small, the momentum of the fuel spray decreases, and hence the spray is less likely to disperse, due to the effects of the negative pressure region near the nozzle hole, and the effects of the drag force. As a result, the volume of the air-fuel mixture layer decreases. On the other hand, when the effective cross-sectional area of the nozzle hole is large and the particle size of the fuel spray is large, the fuel spray is less likely to be affected by the negative pressure region, and is also less likely to be attenuated by the drag force. This leads to great momentum, allowing the fuel spray to fly further. As a result, the volume of the air-fuel mixture layer can increase.

Accordingly, when the temperature in the combustion chamber is high, setting the amount of fuel injected through the first injection mode to be larger than the amount of fuel injected through the second injection mode enables an increase in the volume of the air-fuel mixture layer. By contrast, when the temperature in the combustion chamber is low, setting the amount of fuel injected through the second injection mode to be larger than the amount of fuel injected through the first injection mode enables a reduction in the volume of the air-fuel mixture layer.

The control section may have the injector inject the fuel when a pressure in the cylinder is more than or equal to a predetermined pressure to form, in the combustion chamber, the air-fuel mixture layer and a gas layer made of fresh air and/or burnt gas around the air-fuel mixture layer.

The time "when a pressure in the cylinder is more than or equal to a predetermined pressure" is, for example, when the pressure in the cylinder reaches and exceeds a predetermined pressure as the compression stroke proceeds. Other examples may include the time when the pressure in the cylinder reaches and exceeds a predetermined pressure due to a high boost pressure in a period from an initial period of the second half of the compression stroke to the end of the compression stroke.

Injecting the fuel when the pressure in the cylinder is relatively high reduces the spreading of the fuel spray. This allows for forming the air-fuel mixture layer made of an air-fuel mixture at greater than or equal to a predetermined equivalence ratio, and forming a gas layer around the air-fuel mixture layer. The gas layer is a layer which contains substantially no fuel (specifically, a layer with an equivalence ratio φ less than or equal to 0.1) and contains fresh air and exhaust gas.

The control section may have the injector inject the fuel during a second half of a compression stroke to form the gas layer between the air-fuel mixture layer and a wall surface defining the combustion chamber at a time of ignition of an air-fuel mixture of the air-fuel mixture layer.

At the burning of the air-fuel mixture constituting the air-fuel mixture layer, the gas layer formed around the air-fuel mixture layer serves as a heat-insulating layer intervening between the air-fuel mixture layer and the wall surface defining the combustion chamber. This configuration significantly reduces the cooling loss.

The wall surface of the combustion chamber may be an inner wall surface of a recessed cavity formed in a top surface of the piston.

The fuel spray injected from the injector forms an air-fuel mixture layer in a recessed cavity. Forming the gas layer between the inner wall surface of the cavity and the air-fuel mixture layer with reliability allows for significantly reducing the cooling loss.

The techniques disclosed herein are directed to a device for controlling a direct injection gasoline engine, including: an engine body which has a piston in a cylinder and of which a combustion chamber is defined by the cylinder and the piston; an injector configured to inject a fuel containing at least gasoline into the combustion chamber through a nozzle hole; and a control section configured to control a fuel injection amount to be injected into the combustion chamber, and an injection state of the injector, according to an operational state of the engine body.

The injector has a nozzle body provided with the nozzle hole, and a valve element which opens and closes the nozzle hole. The injector is configured such that an effective cross-sectional area of the nozzle hole increases as a lift amount of the valve element increases. The control section may have the injector carry out a multi-stage injection, and the control section may predict a state of temperature in the combustion chamber, and provides a larger average lift amount during the fuel injection when the predicted temperature is high, than when the predicted temperature is low, even when same fuel amounts are injected.

The "average lift amount" in the case of the multi-stage injection including a plurality of fuel injections refers to an arithmetic average of the lift amounts of the plurality of injections. The amount of fuel per injection increases, and the number of injections therefore decreases, when the average lift amount of the multi-stage injection is set to be relatively large while keeping the same fuel injection amount. On the other hand, the amount of fuel per injection decreases, and the number of injections therefore increases, when the average lift amount of the multi-stage injection is set to be small.

Further, the fuel injection period has some constraints in relation to combustion timing. Thus, the injection interval needs to be shortened if the number of injections increases.

Further, in the injector of the above configuration, the larger the lift amount of the valve element, the greater the effective cross-sectional area of the nozzle hole.

This means that, in the same fuel injection amount, a larger average lift amount tends to result in a larger particle size of the fuel spray, and/or tends to result in a longer injection interval, and that a smaller average lift amount tends to result in a smaller particle size of the fuel spray, and/or tends to result in a shorter injection interval. As described above, increasing the particle size of the fuel spray, and/or increasing the injection interval is advantageous in increasing the volume of the air-fuel mixture layer; and decreasing the particle size of the fuel spray, and/or shortening the injection interval is advantageous in decreasing the volume of the air-fuel mixture layer. Thus, increasing the average lift amount in the multi-stage injection when it is predicted that the state of temperature in the combustion chamber is high, results in an increase in the volume of the air-fuel mixture layer. This is advantageous in reducing the combustion temperature. By contrast, decreasing the average lift amount in the multi-stage injection when it is predicted that the state of temperature in the combustion chamber is low, results in a reduction in the volume of the air-fuel mixture layer. This is advantageous in increasing the combustion temperature. As a result, good exhaust gas emission performance can be maintained while keeping the combustion temperature in a desired range.

The control section may determine an amount of fuel to be injected from the injector such that an air-fuel ratio, which is a proportion of weight of air in the cylinder to weight of the fuel to be injected, is greater than a stoichiometric air-fuel ratio and is lean, in forming the air-fuel mixture layer and a gas layer made of fresh air and/or burnt gas around the air-fuel mixture layer.

The combustion at a lean air-fuel ratio allows for reducing the combustion temperature to a relatively low temperature. This results in a small temperature gradient between the inner wall of the combustion chamber and the combustion temperature, and allows for reducing the cooling loss.

Advantages of the Invention

This device for controlling a direct injection gasoline engine, as explained above, allows for keeping satisfactory exhaust gas emission performance by changing a combustion temperature through control of a volume of an air-fuel mixture layer in a combustion chamber, without a reduction in the thermal efficiency.

BRIEF DESCRIPTION OF THE DRAWINGS

FIG. 8(A) is a conceptual diagram illustrating a spread of a fuel spray when the fuel injection interval is long, and FIG. 8(B) is a conceptual diagram illustrating a spread of a fuel spray when the fuel injection interval is short.

FIG. 10(A) illustrates an example shape of the air-fuel mixture layer when the state of temperature in the combustion chamber is low. FIG. 10(B) illustrates an injection state when the state of temperature in the combustion chamber is low. FIG. 10(C) illustrates an example shape of the air-fuel mixture layer when the state of temperature in the combustion chamber is high. FIG. 10(D) illustrates an injection state when the state of temperature in the combustion chamber is high.

FIG. 11(A)-11(D) show variations. FIG. 11(A) illustrates an example shape of the air-fuel mixture layer when the state of temperature in the combustion chamber is low. FIG. 11(B) illustrates an injection state when the state of temperature in the combustion chamber is low. FIG. 11(C) illustrates an example shape of the air-fuel mixture layer when the state of temperature in the combustion chamber is high. FIG. 11 (D) illustrates an injection state when the state of temperature in the combustion chamber is high.

FIG. 12 shows a second embodiment. FIG. 12(A) illustrates an example shape of the air-fuel mixture layer when the state of temperature in the combustion chamber is low. FIG. 12(B) illustrates an injection state when the state of temperature in the combustion chamber is low. FIG. 12(C) illustrates an example shape of the air-fuel mixture layer when the state of temperature in the combustion chamber is high. FIG. 12(D) illustrates an injection state when the state of temperature in the combustion chamber is high.

FIG. 13 shows a variation of the second embodiment. FIG. 13 (A) illustrates an example shape of the air-fuel mixture layer when the state of temperature in the combustion chamber is low. FIG. 13(B) illustrates an injection state when the state of temperature in the combustion chamber is low. FIG. 13 (C) illustrates an example shape of the air-fuel mixture layer when the state of temperature in the combustion chamber is high. FIG. 13(D) illustrates an injection state when the state of temperature in the combustion chamber is high.

DESCRIPTION OF EMBODIMENTS

Example embodiments will now be described in detail below, based on the drawings.

Figure 1:
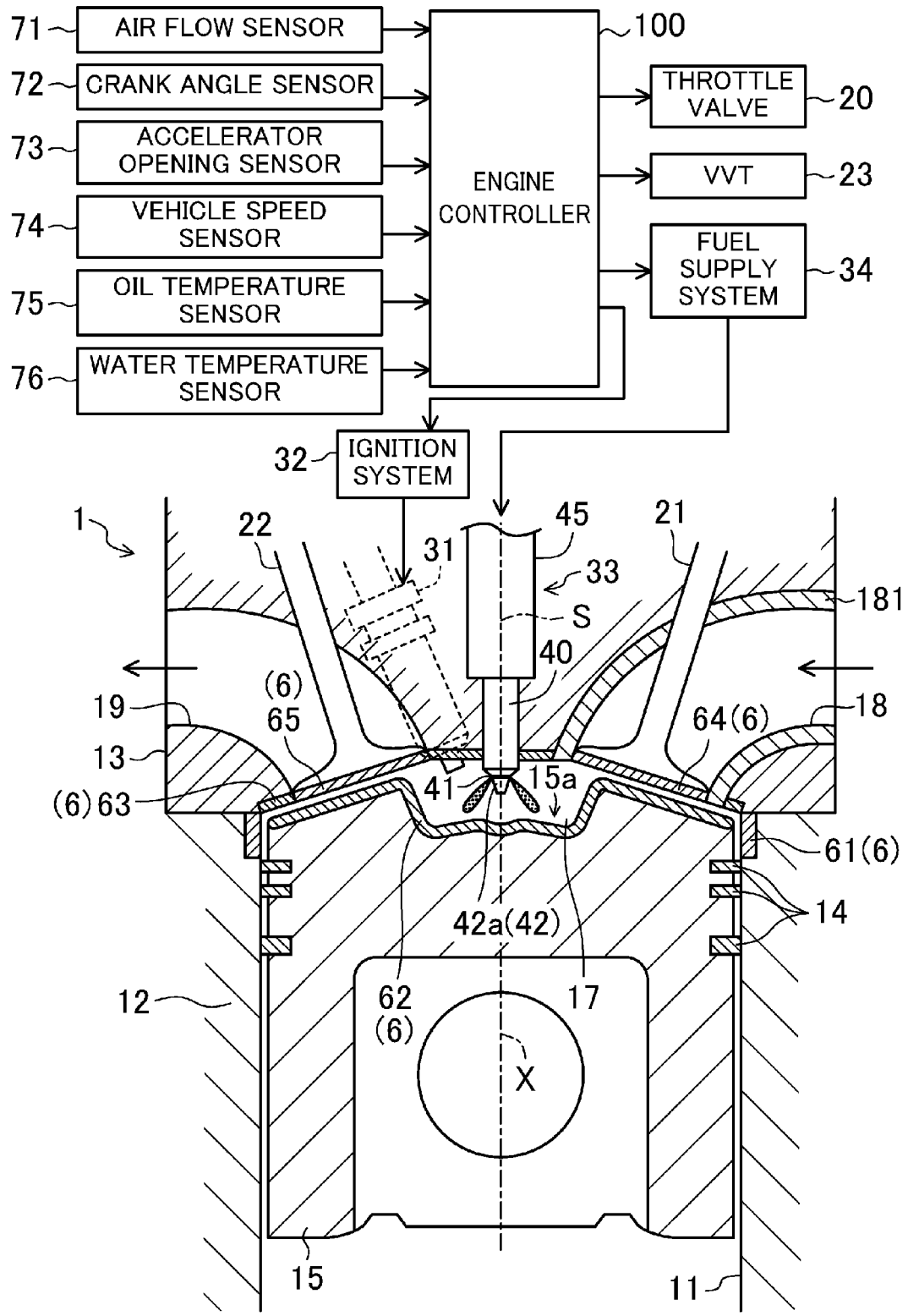
FIG. 1 is a schematic block diagram showing a direct injection gasoline engine.

FIG. 1 schematically illustrates a direct injection gasoline engine 1 (hereinafter simply referred to as an engine 1). The engine 1 includes various actuators associated with an engine body, various sensors, and an engine controller 100 controlling the actuators based on signals from the sensors.

The engine 1 is mounted in a vehicle such as an automobile. Although not shown, the output shaft of the engine 1 is coupled to the driving wheels via a transmission. The output of the engine 1 is transmitted to the driving wheels, so that the vehicle moves forward. The engine body of the engine 1 includes a cylinder block 12, and a cylinder head 13 mounted on the cylinder block 12. A plurality of cylinders 11 are formed inside the cylinder block 12 (FIG. 1 illustrates only one cylinder 11). Although not shown, a water jacket, in which cooling water flows, is formed inside the cylinder block 12 and the cylinder head 13.

The fuel of the engine 1 is gasoline in the present embodiment. The fuel may be gasoline containing, e.g., bioethanol. Further, the fuel may be any fuel as long as it is a liquid fuel containing at least gasoline.

A piston 15 is slidably fitted into each of the cylinders 11. The piston 15 defines a combustion chamber 17 together with the cylinder 11 and the cylinder head 13. In the example figure, the combustion chamber 17 is of what is called a pent roof type, with its ceiling surface (i.e., the lower surface of the cylinder head 13) including two inclined surfaces on the intake side and exhaust side. The top surface of the piston 15 is in a raised form corresponding to the ceiling surface. A recessed cavity (a recess) 15a is formed in a central portion of the top surface. Note that the ceiling surface and the top surface of the piston 15 may be in any form, as long as below-described high geometric compression ratio can be provided. For example, both of the ceiling surface and the top surface of the piston 15 (i.e., the portion except for the cavity 15a) may be planes perpendicular to the central axis of the cylinder 11. While the ceiling surface may form the triangular roof as described above, the top surface of the piston 15 (i.e., the portion except for the cavity 15a) may be a plane perpendicular to the central axis of the cylinder 11.

Although FIG. 1 illustrates only one intake port, two intake ports 18 are formed in the cylinder head 13 for each cylinder 11. Each of the two intake ports 18 is open at the lower surface of the cylinder head 13 (i.e., at the inclined surface, on the intake side, of the ceiling surface of the combustion chamber 17) to communicate with the combustion chamber 17. Similarly, two exhaust ports 19 are formed in the cylinder head 13 for each cylinder 11. Each of the two exhaust ports 19 is open at the lower surface of the cylinder head 13 (i.e., at the inclined surface, on the exhaust side, of the ceiling surface of the combustion chamber 17) to communicate with the combustion chamber 17. Each of the intake ports 18 is connected to an intake passage (not shown). The intake passage is provided with a throttle valve 20 which controls a flow rate of the intake air. The degree of opening of the throttle valve 20 is controlled in response to a control signal from the engine controller 100. On the other hand, each of the exhaust ports 19 is connected to an exhaust passage (not shown). Although not shown, the exhaust passage is provided with an exhaust gas purifying system having one or more catalyst converter(s). The catalyst converter contains a three-way catalyst.

The cylinder head 13 is provided with an intake valve 21 arranged so as to be capable of shutting off (or closing) the intake port 18 from the combustion chamber 17. The cylinder head 13 is also provided with an exhaust valve 22 arranged so as to be capable of shutting off the exhaust port 19 from the combustion chamber 17. The intake valve 21 is driven by an intake valve drive mechanism. The intake valve 21 and the exhaust valve 22 reciprocate at predetermined timing to open and close the intake port 18 and the exhaust port 19, respectively, thereby exchanging gas in the cylinder 11. Although not shown, the intake valve drive mechanism includes an intake camshaft that is drive-connected to a crankshaft. The intake camshaft rotates in synchronization with the rotation of the crankshaft. Although not shown, an exhaust valve drive mechanism includes an exhaust camshaft that is drive-connected to the crankshaft. The exhaust camshaft rotates in synchronization with the rotation of the crankshaft. At least the intake valve drive mechanism includes a hydraulic, electric, or mechanical variable valve timing (VVT) mechanism 23 capable of continuously changing the phase of the intake camshaft within a predetermined angle range. A continuous variable valve lift (CVVL) mechanism capable of continuously changing the valve lift amount may be included in addition to the VVT mechanism 23.

The cylinder head 13 is provided with a spark plug 31. This spark plug 31 is attached and fixed to the cylinder head 13 with a known structure, such as a screw. In the example figure, the spark plug 31 is attached and fixed to the cylinder head 13 so as to be inclined to the exhaust side with respect to the central axis of the cylinder 11. The tip portion of the spark plug 31 is exposed at a ceiling portion of the combustion chamber 17. The tip portion of the spark plug 31 is located near a nozzle port 41 of an injector 33 described later. The location of the spark plug 31 is not limited thereto. In this embodiment, the spark plug 31 is of a plasma ignition type, and an ignition system 32 includes a plasma generation circuit. The spark plug 31 generates plasma through electric discharge, and injects the plasma as jet from the tip of the spark plug 31 into the cylinder, thereby igniting the fuel. The ignition system 32 receives a control signal from the engine controller 100, and allows electrical conduction to the spark plug 31 so that the spark plug 31 generates plasma at desired ignition timing. The spark plug 31 is not limited to the plasma ignition type, and may be of a commonly used spark ignition type.

Along the central axis X of the cylinder 11, the cylinder head 13 is provided with the injector 33 which directly injects the fuel into the cylinder (i.e., into the combustion chamber 17). The injector 33 is attached and fixed to the cylinder head 13 with a known structure, such as a bracket. The tip of the injector 33 is exposed at the center of the ceiling portion of the combustion chamber 17.

Figure 2:
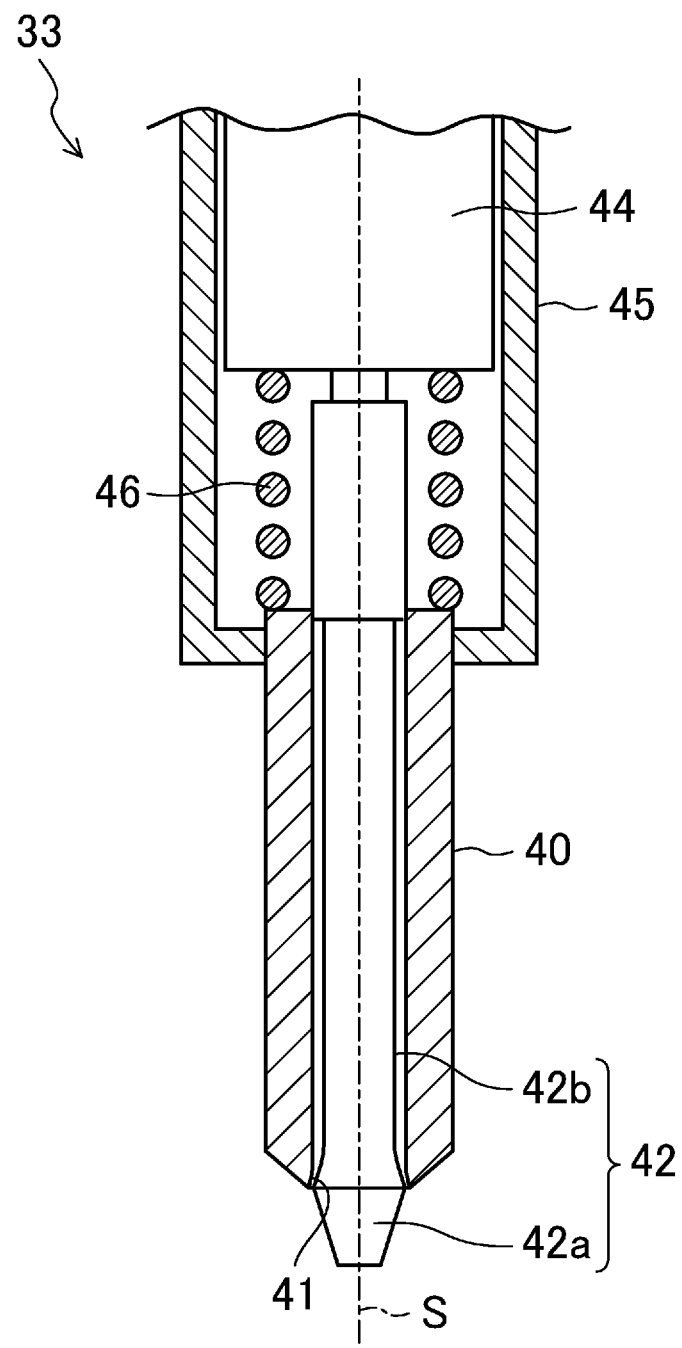
FIG. 2 is a cross-sectional view illustrating an internal structure of an injector.

As illustrated in FIG. 2, the injector 33 is an outwardly-opening valve injector. The outwardly-opening valve injector 33 has a nozzle body 40 with a nozzle port 41 through which the fuel is injected into the cylinder 11, and an outwardly-opening valve 42 which opens and closes the nozzle port 41. The injector 33 injects the fuel in a direction inclined with respect to a predetermined central axis S, that is, spreading radially outward from the central axis S. The effective cross-sectional area of the nozzle port 41 is adjustable. The nozzle port 41 is an example nozzle hole, and the outwardly-opening valve 42 is an example valve element.

The nozzle body 40 is a tubular member extending along the central axis S, and the fuel flows through the inside of the nozzle body 40. The opening edge of the nozzle port 41 is tapered at the tip portion of the nozzle body 40 such that the diameter is gradually increased toward the tip. The proximal end of the nozzle body 40 is connected to a case 45 in which a piezoelectric element 44 is disposed. The outwardly-opening valve 42 has a valve body 42a and a connecting portion 42b. The connecting portion 42b extends from the valve body 42a, passes through the nozzle body 40, and is connected to the piezoelectric element 44. The valve body 42a is exposed to the outside of the nozzle body 40 from the tip of the nozzle body 40. A portion of the valve body 42a on the side closer to the connecting portion 42b has substantially the same shape as the opening edge of the nozzle port 41. When this portion abuts on (i.e., sits on) the opening edge of the nozzle port 41, the nozzle port 41 is closed.

The central axis S of the injector 33 coincides with the central axis X of the cylinder 11, and the nozzle port 41 is arranged so as to be exposed at the ceiling portion of the combustion chamber 17.

The piezoelectric element 44 is deformed by voltage application, thereby pushing the outwardly-opening valve 42 along the central axis, and lifting the valve 42 from the opening edge of the nozzle port 41 of the nozzle body 40. Consequently, the nozzle port 41 is open, when the fuel is injected from the nozzle port 41. The fuel is injected in a direction inclined with respect to the central axis S, that is, spreading radially outward from the central axis S. Specifically, the fuel is injected in the form of a cone (specifically, a hollow cone) with the central axis S as its central axis. In this embodiment, the taper angle of the cone is 90° to 100° (The taper angle of the hollow part inside the hollow cone is about 70°). When the voltage application to the piezoelectric element 44 stops, the piezoelectric element 44 returns to its original shape, so that the outwardly-opening valve 42 closes the nozzle port 41 again. At this time, a compression coil spring 46 provided in the case 45 and arranged around the connecting portion 42b assists the piezoelectric element 44 to return.

Figure 7:
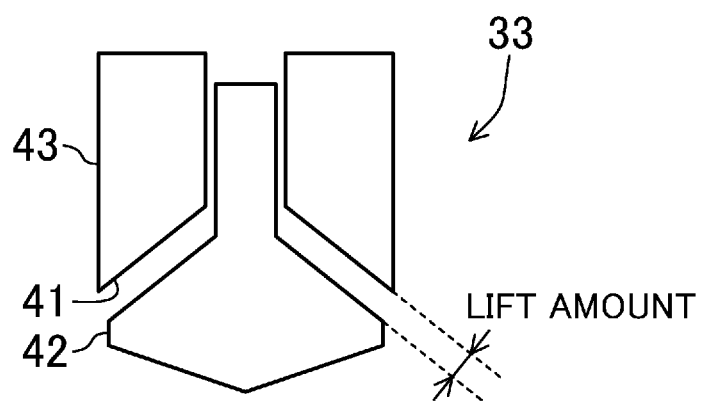
FIG. 7 illustrates a lift amount of an outwardly-opening valve injector.

As the voltage applied to the piezoelectric element 44 increases, the lift amount of the outwardly-opening valve 42 from the state closing the nozzle port 41 (hereinafter simply referred to as a lift amount) increases (see also FIG. 7). The larger the lift amount is, the greater the degree of opening (i.e., the effective cross-sectional area) of the nozzle port 41 becomes, which results in an increase in the size of the particles of the fuel sprayed from the nozzle port 41 into the cylinder. On the other hand, the smaller the lift amount is, the smaller the degree of opening of the nozzle port 41, which results in a reduction in the size of the particles of the fuel sprayed from the nozzle port 41 into the cylinder. Since the piezoelectric element 44 is highly responsive, the injector 33 is capable of multi-stage injection, e.g., about twenty injections in a single cycle. However, the element which operates the outwardly-opening valve 42 is not limited to the piezoelectric element 44.

The injector 33 is also capable of continuous injection in which a predetermined lift amount is kept for a certain period of time.

A fuel supply system 34 includes an electrical circuit for driving the outwardly-opening valve 42 (i.e., the piezoelectric element 44), and a fuel supply system supplying the fuel to the injector 33. The engine controller 100 outputs an injection signal with a voltage corresponding to the lift amount, to the electrical circuit at predetermined timing, thereby operating, via the electrical circuit, the piezoelectric element 44 and the outwardly-opening valve 42 so that a desired amount of the fuel is injected into the cylinder. When the injection signal is not output (i.e., when the injection signal has a voltage of zero), the nozzle port 41 is closed by the outwardly-opening valve 42. In this manner, the operation of the piezoelectric element 44 is controlled by the injection signal from the engine controller 100. The engine controller 100 controls the operation of the piezoelectric element 44, thereby controlling the timing and period of a fuel injection from the nozzle port 41 of the injector 33, and the lift amount at the fuel injection.

Although not shown, the fuel supply system is provided with a high-pressure fuel pump and a common rail. The high-pressure fuel pump pressure-feeds the fuel supplied from a fuel tank through a low-pressure fuel pump, to the common rail, which stores the pressure-fed fuel by a predetermined fuel pressure. Then, the injector 33 is operated to inject the fuel stored in the common rail from the nozzle port 41.

The engine controller 100 is a controller including a known microcomputer as a basis. The engine controller 100 includes a central processing unit (CPU) that executes programs, a memory configured, for example, as a RAM and a ROM and storing programs and data, and an input and output (I/O) bus inputting and outputting electrical signals. The engine controller 100 is an example control section.

The engine controller 100 receives at least a signal indicating the flow rate of intake air from an air flow sensor 71, a crank angle pulse signal from a crank angle sensor 72, an accelerator opening signal from an accelerator opening sensor 73 which detects the degree of depression of the accelerator pedal, a vehicle speed signal from a vehicle speed sensor 74, a lubricating oil temperature signal from an oil temperature sensor 75, and a cooling water temperature signal from a water temperature sensor 76. Based on these input signals, the engine controller 100 calculates parameters for controlling the engine 1, such as desired throttle opening signal, fuel injection pulse, ignition signal, and valve phase angle signal. Then, the engine controller 100 outputs these signals to the throttle valve 20 (more accurately, a throttle actuator which operates the throttle valve 20), the fuel supply system 34 (more accurately, the electrical circuit), the ignition system 32, the VVT mechanism 23, and so on.

Further, although not shown, the engine 1 is provided with an EGR passage connecting the intake passage and the exhaust passage, and therefore includes an EGR system which allows part of the exhaust gas to flow back to the intake air. The engine controller 100 controls the recirculation amount of the exhaust gas through the EGR system, according to the operational state of the engine 1.

The geometric compression ratio ε of the engine 1 is set to range from 15 to 40, both inclusive. An attempt is made to improve the thermal efficiency by increasing the geometric compression ratio. In the engine 1 of this embodiment, the compression ratio is equal to the expansion ratio. Thus, the engine 1 has a high compression ratio and a relatively high expansion ratio at the same time.

As illustrated in FIG. 1, the combustion chamber 17 is defined by the wall surface of the cylinder 11, the top surface of the piston 15, the lower surface (i.e., the ceiling surface) of the cylinder head 13, and the valve head surfaces of the intake valve 21 and the exhaust valve 22. The combustion chamber in this embodiment is not limited to the inner space of the cylinder when the piston 15 is located at its top dead center, but is a combustion chamber in the broad sense of the term, which is the inner space of the cylinder formed irrespective of the location of the piston 15. In this engine 1, heat shield layers 61, 62, 63, 64, 65 are respectively provided at the above-mentioned surfaces to reduce the cooling loss. This insulates the combustion chamber 17 from heat. In the following description, the heat shield layers 61-65 may be collectively referred to as "heat shield layers" with reference numeral "6" added. The heat shield layers 6 may be provided on all or part of the defining surfaces. Further, in the example figure, the heat shield layer 61 of the cylinder wall surface is located at a higher position than piston rings 14 in the state in which the piston 15 is located at its top dead center, thereby preventing the piston rings 14 from sliding on the heat shield layer 61. However, the heat shield layer 61 on the cylinder wall surface is not limited to this structure, and may be extended downward so that is provided on the whole or part of the area corresponding to the stroke of the piston 15. Moreover, the heat shield layer may also be provided on the wall surfaces of the intake ports 18 and the exhaust ports 19 near the openings at the ceiling surface of the combustion chamber 17, although such wall surfaces are not the wall surfaces directly defining the combustion chamber 17. Note that the thicknesses of the heat shield layers 61-65 shown in FIG. 1 are not the actual ones but mere examples, and do not indicate the magnitude relations among the heat shield layers on the respective surfaces.

The heat shielding structure of the combustion chamber 17 will be described in further detail. As described above, the heat shielding structure of the combustion chamber 17 is embodied as the heat shield layers 61-65 provided on the respective refining surfaces that define the combustion chamber 17. These heat shield layers 61-65 are designed to have lower thermal conductivity than the base metal member forming the combustion chamber 17 to prevent the heat of the combustion gas in the combustion chamber 17 from being dissipated through the defining surfaces. The base member of the heat shield layer 61 provided on the wall surface of the cylinder 11 is the cylinder block 12. The base member of the heat shield layer 62 provided on the top surface of the piston 15 is the piston 15. The base member of the heat shield layer 63 provided on the ceiling surface of the cylinder head 13 is the cylinder head 13. The base members of the heat shield layers 64 and 65 provided on the valve head surfaces of the intake valve 21 and the exhaust valve 22, respectively, are the intake valve 21 and the exhaust valve 22, respectively. Thus, the materials of the base members are aluminum alloy or cast iron for the cylinder block 12, the cylinder head 13 and the piston 15, and heat resistant steel or cast iron for the intake valve 21 and the exhaust valve 22.

The heat shield layers 6 preferably have lower volumetric specific heat than the base members to reduce the cooling loss. Specifically, the gas temperature within the combustion chamber 17 varies in accordance with the progress of the combustion cycle. In conventional engines without the heat shielding structure of the combustion chamber 17, the temperature of the surfaces defining the combustion chamber 17 is maintained substantially constant, irrespective of the progress of the combustion cycle, by allowing cooling water to flow in a water jacket formed in a cylinder head and a cylinder block.

On the other hand, the cooling loss is determined by the following equation:

Cooling Loss=Heat Transfer Coefficient×Heat Transfer Area×(Gas Temperature−Temperature of Defining Surfaces)

Thus, the greater the difference between the gas temperature and the temperature of the wall surfaces is, the greater the cooling loss becomes. It is preferable to reduce the difference between the gas temperature and the temperature of the defining surfaces in order to reduce the cooling loss. However, if the temperature of the surfaces defining the combustion chamber 17 is maintained substantially constant by the cooling water, an increase in the temperature difference is inevitable as the gas temperature varies. It is therefore preferable to reduce the thermal capacity of the heat shield layers 6 so that the temperature of the surfaces defining the combustion chamber 17 varies in accordance with the change of the gas temperature in the combustion chamber 17.

The heat shield layers 6 may be formed by coating a base member with a ceramic material, such as $ZrO_2$, by plasma spray coating. The ceramic material may contain a large number of pores. This allows for further reducing the thermal conductivity and volumetric specific heat of the heat shield layers 6.

In this embodiment, as illustrated in FIG. 1, an aluminum titanate port liner 181 with a significantly low thermal conductivity, superior heat insulating properties, and superior heat resistance properties, is integrally casted in the cylinder head 13, thereby providing a heat shield layer in the intake port 18. This structure reduces or prevents a temperature increase of fresh air, due to heat from the cylinder head 13, when the fresh air passes through the intake port 18. This reduces the temperature of the fresh air (i.e., the initial gas temperature) to be introduced into the cylinder 11, and hence reduces the gas temperature at the time of combustion. As a result, the difference between the gas temperature and the temperature of the surfaces defining the combustion chamber 17 is reduced. The reduction in the gas temperature at the time of combustion reduces the heat transfer coefficient, which is more advantageous in reducing the cooling loss. The structure of the heat shield layer in the intake port 18 is not limited to the internal casting of the port liner 181.

In this engine 1, as described above, the geometric compression ratio $\epsilon$ is set to $15 \leq \epsilon \leq 40$. In the Otto cycle, which is the theoretical cycle, the theoretical thermal efficiency $\eta_{th}$ is expressed by $\eta_{th} = 1 - 1/(\epsilon^{\kappa-1})$. The theoretical thermal efficiency $\eta_{th}$ increases with the increasing compression ratio $\epsilon$. However, the indicated thermal efficiency of engines (specifically, engines without any heat shielding structure in combustion chambers) peaks at a predetermined geometric compression ratio $\epsilon$ (e.g., about 15). Even if the geometric compression ratio $\epsilon$ is further increased, the indicated thermal efficiency does not increase, but on the contrary, it decreases. This is because the greater the compression ratio is, the higher the combustion pressure and the combustion temperature become, in the case where the compression ratio is increased while maintaining the fuel amount and the amount of intake air constant. As described above, an increase in the combustion pressure and the combustion temperature leads to an increase in the cooling loss.

By contrast, the engine 1 is combined with the heat shielding structure of the combustion chamber 17 such that the indicated thermal efficiency is high when the geometric compression ratio $\epsilon$ is high. That is, the indicated thermal efficiency is increased by shielding the combustion chamber 17 from heat and thereby reducing the cooling loss.

On the other hand, merely shielding the combustion chamber 17 from heat to reduce the cooling loss does not contribute much to an improvement in the indicated thermal efficiency, since the reduced cooling loss is converted to the exhaust loss. Regarding this point, as described above, the engine 1 efficiently converts the energy of the combustion gas corresponding to the reduced cooling loss, into mechanical work, due to an increased expansion ratio in accordance with an increased compression ratio. That is, the engine 1 significantly improves the indicated thermal efficiency by employing the structure which reduces both of the cooling loss and the exhaust loss.

This engine 1 includes heat-insulating layers, which are gas layers, in the cylinder (i.e., in the combustion chamber 17) in addition to the above-described heat shielding structure in the combustion chamber 17 and the intake port 18, thereby further reducing the cooling loss. This will be described in detail below.

Figure 3:
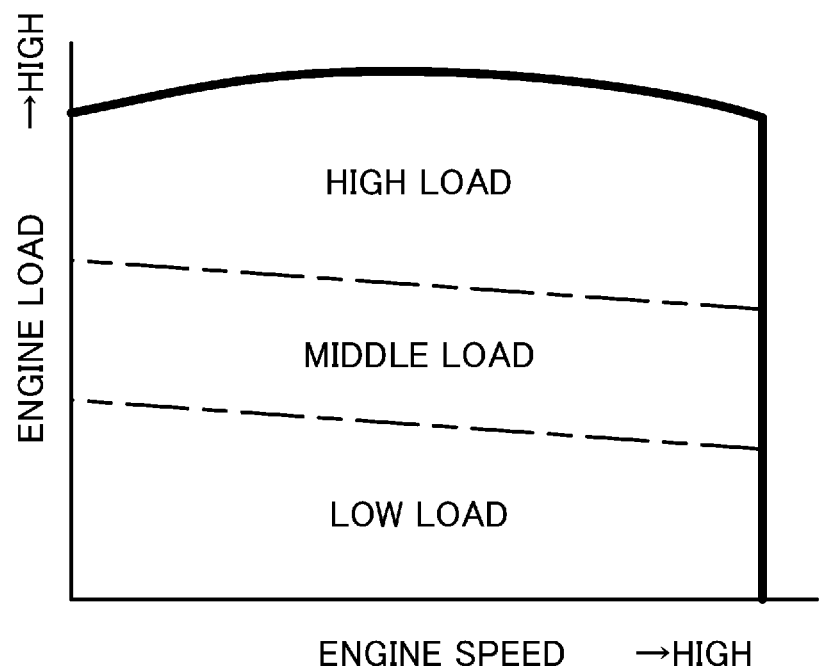
FIG. 3 is an example operation map of the engine.

FIG. 3 illustrates an example operation map when the engine 1 is warm. The engine 1 is basically configured to burn the air-fuel mixture in the combustion chamber 17 by compression self-ignition in the entire operation range. In the operation map shown in FIG. 3, heat-insulating layers made of gas layers are formed in the combustion chamber 17 in a low load region with a load lower than a predetermined load, and in a middle load region with a load higher than the load in the low load region. In other words, the heat-insulating layers made of gas layers are formed in the combustion chamber 17 in such an operational state in which the engine load is relatively low, and hence a fuel injection amount is relatively small. This structure is intended to reduce the cooling loss and improve the thermal efficiency. The low load region and the middle load region may be defined as corresponding to a low region and a middle region, respectively, when the engine load region is divided into three regions, i.e., low, middle, and high regions (e.g., three equal regions). Further, the middle load region, in particular, may be defined as a region in which, for example, the load is lower than or equal to a predetermined load with respect to the full load (e.g., a load of 70% or less).

Figure 4:
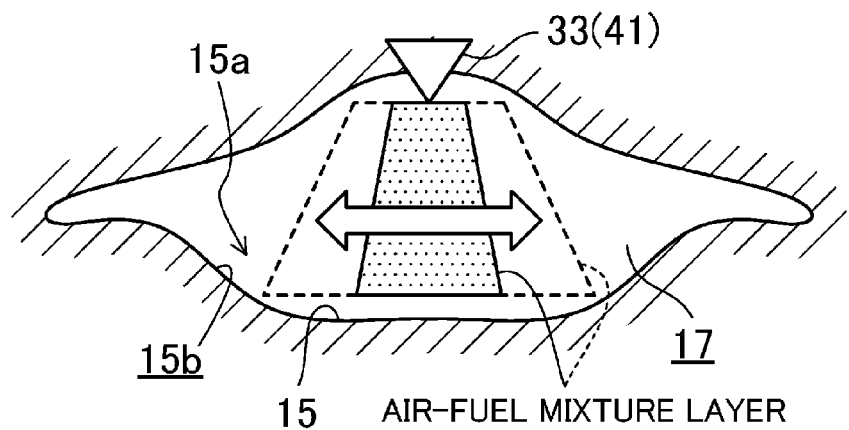
FIG. 4 is a cross-sectional view conceptually illustrating the shape of an air-fuel mixture layer formed in the combustion chamber.

FIG. 4 conceptually illustrates the shape of the air-fuel mixture layer formed in the combustion chamber 17 in the low and middle load regions. Forming a heat-insulating layer made of a gas layer in the combustion chamber 17 means to form, as illustrated in FIG. 4, an air-fuel mixture layer in a central portion of the combustion chamber 17 including the cavity 15a formed on the top surface of the piston 15, and to form a gas layer containing fresh air in a space between the air-fuel mixture layer and an inner wall surface 15b of the cavity 15a. The gas layer may contain only fresh air, or may contain burnt gas (i.e., EGR gas) in addition to the fresh air. As will be described later, mixture of a small amount of the fuel into the gas layer is admissible as long as the gas layer serves as a heat-insulating layer.

Reducing the ratio (S/V) between the surface area (S) and the volume (V) of the air-fuel mixture layer leads to a reduction in the heat transfer area transferring heat with the surrounding gas layer at the time of combustion. In addition, the gas layer between the air-fuel mixture layer and the wall surfaces of the combustion chamber 17 prevents contact between the flame of the air-fuel mixture layer and the wall surfaces of the combustion chamber 17. Moreover, the gas layer itself serves as a heat-insulating layer, and hence prevents heat dissipation from the wall surfaces of the combustion chamber 17. As a result, the cooling loss decreases significantly.

The engine controller 100 outputs the injection signal to the electrical circuit of the fuel supply system 34 so that the fuel is injected from the nozzle port 41 of the injector 33 into the cylinder 11 during a period from the latter half of a compression stroke to an initial period of an expansion stroke. The latter half of the compression stroke is the second half of the compression stroke, when the compression stroke is divided into the first and second halves. The initial period of the expansion stroke is the initial period when the expansion stroke is divided into initial, interim, and terminal periods. In this manner, the air-fuel mixture layer is formed in the central portion of the combustion chamber 17, and the gas layer is formed around the air-fuel mixture layer.

The fuel injection amount is relatively small in the low load region. Thus, injecting the fuel into the cylinder 11 during the period from the latter half of the compression stroke to the initial period of the expansion stroke reduces the spread of the fuel spray, thereby allowing the air-fuel mixture layer to be relatively easily formed in the central portion in the combustion chamber 17, and the gas layer around the air-fuel mixture layer. However, an increase in the amount of fuel combustion and injection leads to a longer period for fuel injection, which makes the fuel spray more likely to spread particularly along the central axis X of the cylinder 11. As a result, the air-fuel mixture layer comes in contact, for example, with the top surface of the piston 15, and thus, the gas layer is not reliably formed around the air-fuel mixture layer. As mentioned earlier, the engine 1 has a high geometric compression ratio, and hence a small capacity of the combustion chamber (the "combustion chamber" as used herein is an internal space in the cylinder when the piston 15 is located at its compression top dead center). Thus, in this engine 1, the air-fuel mixture layer is likely to contact with the top surface of the piston 15 when the fuel spray spreads along the central axis X of the cylinder 11.

Accordingly, in order to reliably form the air-fuel mixture layer in the central portion of the combustion chamber 17 and the gas layer around the air-fuel mixture layer in the middle load region, as well, with an increased fuel injection amount, the engine 1 controls the shape of the air-fuel mixture layer to be formed in the combustion chamber 17. Specifically, as indicated by the white arrows in FIG. 4, the fuel spray is brought to spread outward in a radial direction intersecting the central axis X of the cylinder 11, thereby reducing the degree of extension of the length of the air-fuel mixture layer along the central axis X, and preventing the air-fuel mixture layer from contacting with the top surface of the piston 15. Moreover, the air-fuel mixture layer is expanded outward in the radial direction where there is more space than along the central axis X, thereby preventing the air-fuel mixture layer from contacting with the inner surface of the cylinder 11, as well. Controlling the shape of the air-fuel mixture layer to be formed in the combustion chamber 17 is, in other words, to control the ratio (L/W) between the length L and the width W, where L is a length of the air-fuel mixture layer formed in the combustion chamber 17 along the central axis, and W is a width of the air-fuel mixture layer in the radial direction. That is, although the L/W ratio is set to a predetermined value or more to reduce the S/V ratio, the L/W ratio is decreased when the fuel injection amount increases.

Figure 5:
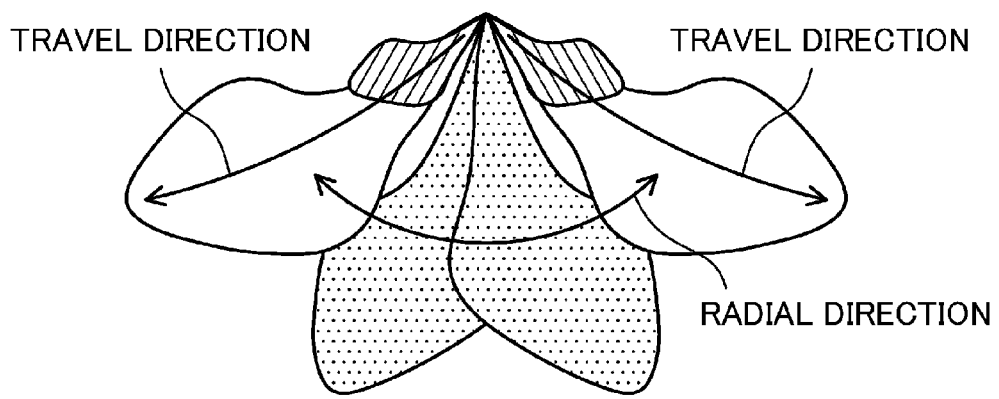
FIG. 5 illustrates a spreading direction of a fuel spray injected from the injector.
Figure 6:
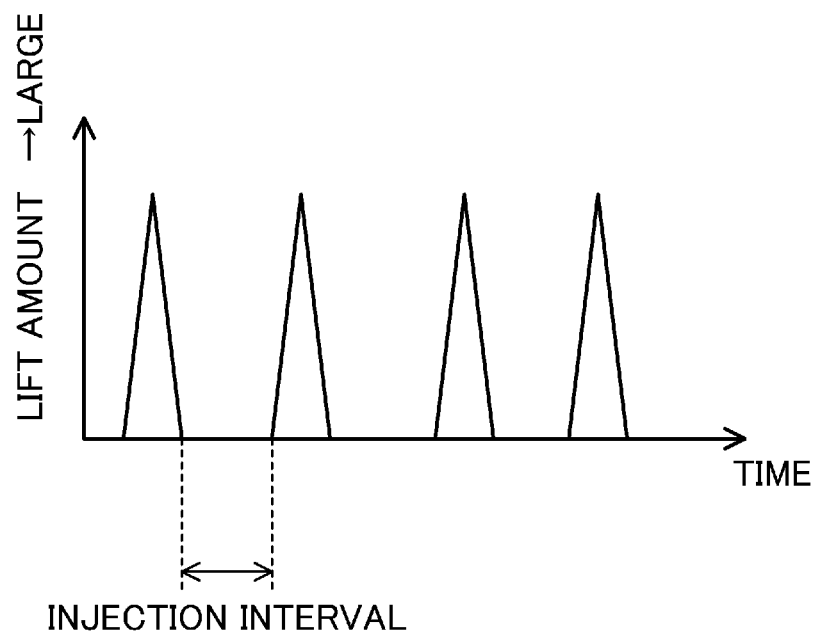
FIG. 6 shows fuel injection intervals.

To control the shape of the air-fuel mixture layer, the engine 1 controls the intervals between fuel injections (see FIG. 6) of the injector 33 and a lift amount (see FIG. 7) of the injector 33. This allows for controlling the spread of the fuel spray in its travel direction, and the spread of the fuel spray in the radial direction, independently of each other, as shown in FIG. 5. The interval between the fuel injections is defined as an interval between the end of a fuel injection and the start of a subsequent fuel injection, as conceptually illustrated in FIG. 6. As described earlier, this injector 33 is highly responsive, and is capable of multi-stage injection, e.g., twenty-time injections in a period of 1-2 msec. Further, the lift amount of the injector 33 is proportional to the opening area for fuel injection, as conceptually illustrated in FIG. 7. As described earlier, the greater the lift amount is, the larger the opening area for fuel injection (i.e., the effective cross-sectional area of the nozzle port 41) becomes, and the smaller the lift amount is, the smaller the opening area for fuel injection becomes.

FIGS. 8(A) and 8(B) conceptually illustrate the difference in the spreading of the fuel spray between the case in which the fuel injection interval is long (FIG. 8(A)) and the case in which the fuel injection interval is short (FIG. 8(B)), while keeping the same lift amount of the injector 33. The fuel spray injected in the form of a hollow cone from the injector 33 flows at high speed in the combustion chamber 17. Thus, although the fuel spray jet pulls the fluid surrounding itself and takes it therein, the fluid is less likely to flow into the hollow cone. As a result, a negative pressure region is generated inside the hollow cone along the central axis S of the injector 33 (the central axis S coincides with the central axis X of the cylinder 11). When the fuel injection interval is long, the pressure in the negative pressure region recovers during a period between a fuel injection and a subsequent fuel injection, and thus, the negative pressure region becomes smaller in size. By contrast, when the fuel injection interval is short, the fuel injections are frequently repeated, giving less time to recover the pressure in the negative pressure region. As a result, the negative pressure region increases in size as illustrated in FIG. 8(B).

The fuel spray is drawn to this negative pressure. The negative pressure region is formed at a portion closer, in the radial direction, to the central axis S. Thus, the spreading of the fuel spray in the radial direction is reduced, as illustrated in FIG. 8(B), when the negative pressure region is relatively large in size. By contrast, the fuel spray is not so much drawn to the negative pressure region when the negative pressure region is relatively small in size, and hence is more likely to spread in the radial direction as illustrated in FIG. 8(A). In other words, a shorter interval between the fuel injections of the injector 33 allows for reducing the spread of the fuel spray in the radial direction. On the other hand, a longer interval allows for increasing the spread of the fuel spray in the radial direction.

Figure 9A:
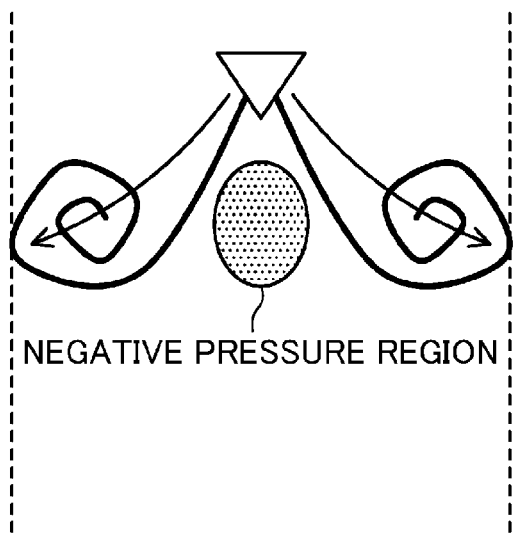
FIG. 9(A) is a conceptual diagram illustrating a spread of a fuel spray when the lift amount of the injector is small.
Figure 9B:
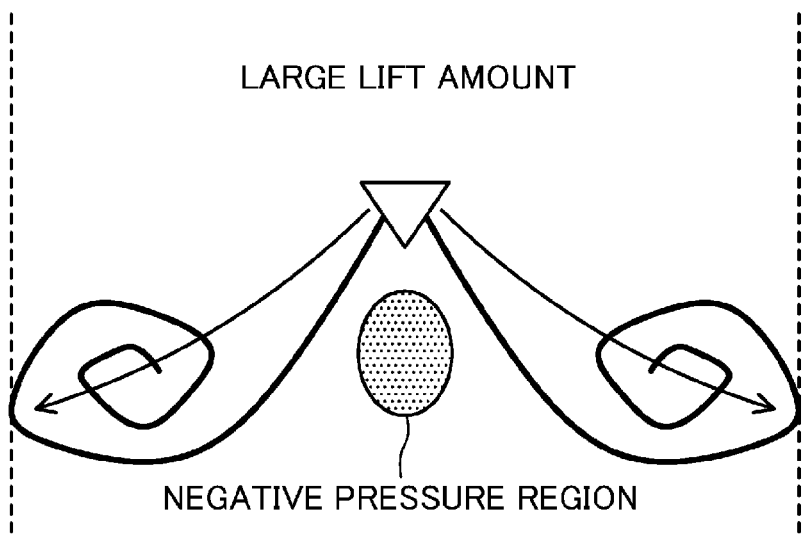
FIG. 9(B) is a conceptual diagram illustrating a spread of a fuel spray when the lift amount of the injector is large.

FIG. 9 conceptually illustrates the difference in the spreading of the fuel spray between the case in which the lift amount of the injector 33 is small (FIG. 9(A)) and the case in which the lift amount of the injector 33 is large (FIG. 9(B)), while keeping the same fuel injection intervals. In these cases, the negative pressure regions in the combustion chamber 17 are the same because the injection intervals are the same, but the particle sizes of the respective fuel sprays are different due to the different lift amounts. That is, the particle size of the fuel spray decreases by reducing the lift amount of the injector 33, which results in a reduction in the momentum of the fuel spray. As a result, the fuel spray is more likely to be drawn to a central portion in the radial direction by the negative pressure, and hence the spread of the fuel spray in the radial direction is reduced as illustrated in FIG. 9(A). By contrast, the particle size of the fuel spray increases by increasing the lift amount of the injector 33, which results in an increase in the momentum of the fuel spray. As a result, the fuel spray is less likely to be drawn to the negative pressure, and hence the fuel spray is more likely to spread in the radial direction as illustrated in FIG. 9(B). That is, an increased lift amount of the injector 33 allows for increasing the spread of the fuel spray in the radial direction. On the contrary, a smaller lift amount allows for reducing the spread of the fuel spray in the radial direction.

If the particles of the fuel spray are large in size, the spreading distance of the fuel spray in the travel direction is extended since the momentum of such particles is large. Moreover, the fuel spray whose particles are large in size is less likely to slow down in speed, even under the effects of the negative pressure region. This also leads to an extended spreading distance. By contrast, if the particles of the fuel spray are small in size, the spreading distance of the fuel spray in the travel direction is shortened since the momentum of such particles is small. Moreover, the fuel spray whose particles are small in size is likely to slow down in speed under the effects of the negative pressure region. This also leads to a shortened spreading distance.

In this manner, the spreading of the fuel spray in the radial direction and the spreading of the fuel spray in the travel direction can be controlled independently of each other by changing the injection interval and lift amount of the injector 33. Thus, the engine 1 combines a first injection group including a plurality of fuel injections in which the lift amount is relatively large and the injection interval is relatively long, and a second injection group including a plurality of fuel injections in which the lift amount is relatively small and the injection interval is relatively short, thereby controlling the shape of the air-fuel mixture layer. Each of the injection groups performs a multi-stage injection in which a plurality of fuel injections are carried out. The multi-stage injection as used herein means fuel injections with a fuel injection interval (i.e., an interval between the end of a fuel injection and the start of a subsequent fuel injection) of less than or equal to 0.5 ms.

Specifically, the first injection group includes the predetermined number of fuel injections in which the lift amount of the injector 33 is set to be larger than that in the second injection group, and the fuel injection interval is set to be longer than that in the second injection group. The longer injection interval makes the negative pressure region smaller in size. In addition, the larger lift amount makes the fuel spray have larger particle size, and hence larger momentum of the fuel spray. As a result, such a fuel spray is formed whose spreading distance in the travel direction is relatively long and which spreads in the radial direction.

The second injection group includes the predetermined number of fuel injections in which the lift amount of the injector 33 is set to be smaller than that in the first injection group, and the fuel injection interval is set to be shorter than that in the first injection group. The shorter injection interval makes the negative pressure region larger in size. In addition, the smaller lift amount makes the fuel spray have smaller particle size, and hence smaller momentum of the fuel spray. As a result, such a fuel spray is formed whose spreading distance in the travel direction is relatively short and of which the spreading in the radial direction is reduced.

The engine controller 100 changes the ratio between the first injection group and the second injection group according to the operational state of the engine 1, thereby changing the shape of the air-fuel mixture layer into one suitable for the operational state of the engine 1. The basic mechanism is as follows: An air-fuel mixture layer expanding radially outward is formed by increasing the ratio of the first injection group, whereas an air-fuel mixture layer whose radially-outward expansion is reduced is formed by increasing the ratio of the second injection group.

Note that, depending on the operational state of the engine 1, the first injection group may be omitted and only the second injection group is performed; the first injection group may include only one fuel injection, and all the rest are the injections of the second injection group; the second injection group may be omitted and only the first injection group is performed; or the second injection group may include only one fuel injection, and all the rest are the injections of the first injection group. Alternatively, the first injection group may be followed by the second injection group, or the second injection group may be followed by the first injection group.

The engine controller 100 not only changes the state of the multi-stage injection according to the operational state of the engine 1, but also changes the state of the multi-stage injection according to the state of temperature in the combustion chamber 17, as well. Specifically, as described above, the engine 1 is configured to burn the air-fuel mixture in the combustion chamber 17 by compression self-ignition in the entire operation range. The combustion temperature is controlled to be in a predetermined range (e.g., in a range of 1500 to 1800 K) by controlling the gas state in the cylinder 11, or various parameters, such as fuel injection timing, thereby maintaining good performance in exhaust gas emission. That is, the excessively low combustion temperature (e.g., below 1500 K) reduces the combustion stability, which increases unburned substances, and hence the amount of emission of the unburned substances. On the other hand, the excessively high combustion temperature (e.g., above 1800 K) increases the generation of RawNOx, and hence the emission of NOx.

However, the compression end temperature, which is the temperature in the cylinder 11 when the piston 15 reaches its compression top dead center (i.e., the temperature in the combustion chamber in a motoring state), is low when the intake air temperature is low, such as in an environment where the outside temperature is low, or when the temperature of the inner wall surface of the cylinder 11 is low, such as immediately after the start of an engine. As a result, the combustion temperature may deviate, toward a low temperature side, from a predetermined range. On the other hand, the compression end temperature increases when the intake air temperature is high, or when the temperature of the inner wall surface of the cylinder 11 is high. As a result, the combustion temperature may deviate, toward a high temperature side, from a predetermined range. Either case will lead to degradation of the exhaust gas emission performance.

To avoid this, the engine controller 100 controls the combustion temperature by changing the state of the multi-stage injection according to the state of temperature in the combustion chamber 17, thereby making the combustion temperature fall within a predetermined range.

Specifically, the engine controller 100 predicts the compression end temperature. The compression end temperature is predicted based on an outdoor temperature detected by the air flow sensor 71, a lubricating oil temperature detected by the oil temperature sensor 75, and a cooling water temperature detected by the water temperature sensor 76, as well as based on an amount of intake air charge, and an amount of recirculation of the exhaust gas. If the predicted compression end temperature is low, and the combustion temperature may deviate, toward a low temperature side, from a predetermined range, the volume of the air-fuel mixture layer is reduced as illustrated in FIG. 10(A). Note that the fuel injection amount corresponds to the load required for the engine 1 to output. A reduction in the volume of the air-fuel mixture layer increases the fuel density of the air-fuel mixture layer. Increased fuel density leads to an increase in the temperature at the combustion of the air-fuel mixture forming the air-fuel mixture layer. This allows the combustion temperature to fall within the predetermined range even when the compression end temperature is low.

By contrast, if the predicted compression end temperature is high, and the combustion temperature may deviate, toward a high temperature side, from the predetermined range, the volume of the air-fuel mixture layer is increased as illustrated in FIG. 10(C). Note that the fuel injection amount corresponds to the load required for the engine 1 to output, and is assumed to be in the same state as illustrated in FIG. 10(A). An increase in the volume of the air-fuel mixture layer reduces the fuel density of the air-fuel mixture layer. Reduced fuel density leads to a reduction in the temperature at the combustion of the air-fuel mixture forming the air-fuel mixture layer. This allows the combustion temperature to fall within the predetermined range even when the compression end temperature is high.

The "air-fuel mixture layer" as used herein is defined as a layer made of a combustible air-fuel mixture (e.g., an air-fuel mixture with an equivalence ratio φ of more than or equal to 0.1). Further, the fuel spray spreads with time after the start of the fuel injection. The size of the air-fuel mixture layer used herein is the size at the time of ignition. The ignition is considered as ignition when, for example, a fuel combustion mass ratio turns to 1% or more.

In order to control the volume of the air-fuel mixture layer as described above, the engine controller 100 changes the ratio between the first injection group and the second injection group even if the injection amounts are the same. Specifically, as illustrated in FIG. 10(B), the proportion of the first injection group 8 is reduced (i.e., two fuel injections 80) and the proportion of the second injection group 9 is increased (i.e., nine fuel injections 90), thereby reducing the volume of the air-fuel mixture layer as illustrated in FIG. 10(A). Further, as illustrated in FIG. 10(D), the proportion of the first injection group 8 is increased (i.e., three fuel injections 80) and the proportion of the second injection group 9 is reduced (i.e., six fuel injections 90), thereby increasing the volume of the air-fuel mixture layer as illustrated in FIG. 10(C). As the comparison between FIGS. 10(A) and 10(C) clearly shows, the volume of the air-fuel mixture layer increases by increasing its width, in the radial direction, which intersects the central axis of the cylinder 11, while keeping the same length along the central axis of the cylinder 11. This technique allows for increasing the volume of the air-fuel mixture layer without bringing it to contact with the surfaces defining the combustion chamber 17, particularly the wall surface 15b of the cavity 15a.

As illustrated in FIGS. 10(B) and 10(D), the lift amount of each fuel injection 80 included in the first injection group 8 is relatively large, and each injection interval of the fuel injections 80 is relatively wide, and the lift amount of each fuel injection 90 included in the second injection group 9 is relatively small, and each injection interval of the fuel injections 90 is relatively narrow.

Changing the ratio between the first injection group 8 and the second injection group 9 can be translated into changing an average lift amount of the multi-stage injection including the first injection group 8 and the second injection group 9. The average lift amount is an arithmetic average of the lift amounts of the first injections 80 and the lift amounts of the second injections 90, and is expressed by the following formula (1):

$$\{(\text{lift amount of first injection 80}) \times (\text{the number of first injections 80}) + (\text{lift amount of second injection 90}) \times (\text{the number of second injections 90})\} /$$

$$\{(\text{the number of first injections 80}) + (\text{the number of second injections 90})\} \quad (1)$$

That is, as indicated by the dash dot lines in FIG. 10, the average lift amount of the multi-stage injection decreases when the proportion of the first injection group 8 is increased and the proportion of the second injection group 9 is reduced, and the average lift amount of the multi-stage injection increases when the proportion of the first injection group 8 is reduced and the proportion of the second injection group 9 is increased. Thus, the engine controller 100 may reduce the volume of the air-fuel mixture layer by reducing the average lift amount of the multi-stage injection when the predicted compression end temperature is low, and may increase the volume of the air-fuel mixture layer by increasing the average lift amount of the multi-stage injection when the predicted compression end temperature is high.

As described above, depending on the operational state of the engine 1, the first injection group may be omitted and only the second injection group is carried out, or the second injection group may be omitted and only the first injection group is carried out. When the compression end temperature is low, the first injection group 8 may be omitted and only the second injection group 9 is carried out as illustrated in FIGS. 11(A) and 11(B). This allows for further reducing the volume of the air-fuel mixture layer formed in the combustion chamber 17, and further increasing the combustion temperature. On the other hand, when the compression end temperature is high, the second injection group 9 is omitted and only the first injection group 8 is carried out as illustrated in FIGS. 11(C) and 11(D). This allows for further increasing the volume of the air-fuel mixture layer formed in the combustion chamber 17 on the presumption that a gas layer is formed around the air-fuel mixture layer, and further reducing the combustion temperature.

Instead of changing the ratio between the first injection group 8 and the second injection group 9, execution of only the first injection group 8 and execution of only the second injection group 9 may be switched according to whether the predicted compression end temperature is high or low, as illustrated in FIG. 11. Specifically, when the compression end temperature is lower than a predetermined value, the second injection group 9 is selected (i.e., turning to a second injection mode) to reduce the volume of the air-fuel mixture layer, whereas when the compression end temperature is higher than a predetermined value, the first injection group 8 is selected (i.e., turning to a first injection mode) to increase the volume of the air-fuel mixture layer. Even in the case where the execution of the first injection group 8 and the execution of the second injection group 9 are switched, the relation between the compression end temperature and the average lift amount of the multi-stage injection is the same as that described above. That is, when the compression end temperature is low, the second injection group 9 is selected to reduce the average lift amount, thereby reducing the volume of the air-fuel mixture layer. On the other hand, when the compression end temperature is high, the first injection group 8 is selected to raise the average lift amount, thereby increasing the volume of the air-fuel mixture layer.

In the configuration in which the first injection group 8 and the second injection group 9 are switched, the lift amount or the injection interval may be controlled in the selected first injection group 8, according to the predicted compression end temperature. Similarly, when the second injection group 9 is selected, the lift amount or the injection interval may be controlled in the selected second injection group 9, according to the predicted compression end temperature.

The first injection group 8 is not limited to the injection state illustrated in FIGS. 10 and 11. The number of fuel injections included in the first injection group 8 is not limited to three or two, and may be one, or four or more. Here, the injections in the first injection group 8 are those in which the lift amount is larger, and/or the injection interval is longer, than the lift amount and/or the injection interval of the second injection group 9. Thus, the plurality of injections in the first injection group 8 may have the same lift amount, or the respective lift amounts of the plurality of injections may be appropriately changed. There are not any limitations in particular in changing the lift amounts of the plurality of injections. The lift amounts may be changed such that they gradually increase or gradually decrease, or the lift amounts may be increased or decreased at random. Similarly, the injection intervals may be changed such that they gradually increase or gradually decrease, or the injection intervals may be increased or decreased at random.

In the first injection group 8, the lift amount and the injection interval are larger than those in the second injection group 9. Instead, one of the lift amount or the fuel injection interval may be larger than the lift amount or the fuel injection interval in the second injection group 9.

In the multi-stage injection, the first injection group 8 is followed by the second injection group 9. Instead, the second injection group 9 may be followed by the first injection group 8.

The injection states illustrated in FIGS. 12(B) and 12(D) and the injection states illustrated in FIGS. 13(B) and 13(D) may be applicable, instead of the above embodiment, to control the volume of the air-fuel mixture layer.

Specifically, in the injection states illustrated in FIGS. 12(B) and 12(D), the fuel injection 801 included in the first injection mode 108 is a continuous injection with a relatively large lift amount, and the fuel injections 90 included in the second injection mode 9 are a multi-stage injection with a relatively small lift amount. The continuous injection is to keep the lift amount of the injector 33 at a predetermined lift amount for a predetermined period of time.

As illustrated in FIG. 12(B), the engine controller 100 controls the proportion of the fuel injection 801 in the first injection mode 108 to be relatively small, and the proportion of the fuel injections 90 in the second injection mode 9 to be relatively large. As illustrated in FIG. 12(A), this control reduces the volume of the air-fuel mixture layer, similarly to the case illustrated in FIG. 10(A).

Further, as illustrated in FIG. 12(C), the volume of the air-fuel mixture layer is increased even in the case of injecting the same amount of fuel, similarly to the case illustrated in FIG. 10(C), by making the proportion of the fuel injection 801 in the first injection mode 108 relatively large, and the proportion of the fuel injections 90 in the second injection mode 9 relatively small.

As the comparison between FIGS. 12(A) and 12(C) clearly shows, the volume of the air-fuel mixture layer increases by increasing its width, in the radial direction, which intersects the central axis X of the cylinder 11, while keeping the same length along the central axis X of the cylinder 11. This technique allows for increasing the volume of the air-fuel mixture layer without bringing it to contact with the surfaces defining the combustion chamber 17.

Instead of changing the ratio between the fuel injection of the first injection mode 108 and the fuel injection of the second injection mode 9, execution of only the first injection mode 108 (i.e., the continuous fuel injection 801) and execution of only the second injection mode 9 (i.e., a plurality of fuel injections 90) may be switched according to whether the predicted compression end temperature is high or low, as illustrated in FIGS. 13(B) and 13(D).

That is, when the compression end temperature is lower than a predetermined value, the second injection mode 9 is selected to reduce the volume of the air-fuel mixture layer, whereas when the compression end temperature is higher than a predetermined value, the first injection mode 108 is selected to increase the volume of the air-fuel mixture layer. In this manner, even in the case where the first injection mode 108 and the second injection mode 9 are switched to each other, the relation between the compression end temperature and the average lift amount is the same as that described above. That is, when the compression end temperature is low, the second injection mode 9 is selected to reduce the average lift amount, thereby reducing the volume of the air-fuel mixture layer as illustrated in FIG. 13(A). On the other hand, when the compression end temperature is high, the first injection mode 108 is selected to increase the average lift amount, thereby increasing the volume of the air-fuel mixture layer as illustrated in FIG. 13(C). The formula (1) described earlier expresses the average lift amount that is an arithmetic average according to the number of injections. In the case where a continuous injection is included, the continuous injection may be converted to a multi-stage injection of which the injection period is equivalent to that of the continuous injection, to obtain the average lift amount by the formula (1).

The second injection mode 9 of the above second embodiment is not limited thereto. Similarly to the first injection mode 108, the second injection mode 9 may have fuel injection characteristics in which the fuel is continuously injected at a predetermined small lift amount.

In the above embodiments, the engine controller 100 controls the amount (the weight) of fuel to be injected into the cylinder 11 by the injector 33, with respect to the air weight detected, such that the air-fuel ratio in the cylinder 11 is greater than the stoichiometric air-fuel ratio by a predetermined degree. In this manner, the combustion temperature is reduced to be a temperature that is lower than the combustion temperature under the conditions of the stoichiometric air-fuel ratio. As a result, the difference between the temperature of the wall surfaces of the combustion chamber 17 and the combustion temperature of the air-fuel mixture layer (i.e., a temperature gradient) is reduced, and the amount of transfer of the combustion heat to the wall of the combustion chamber 17 is reduced by that reduction in the temperature difference, thereby allowing for reducing the cooling loss.

Combining the reduction in the combustion temperature and the formation of the gas layer made of fresh air and/or burnt gas around the air-fuel mixture layer allows for significantly reducing the cooling loss.

Figure 14:
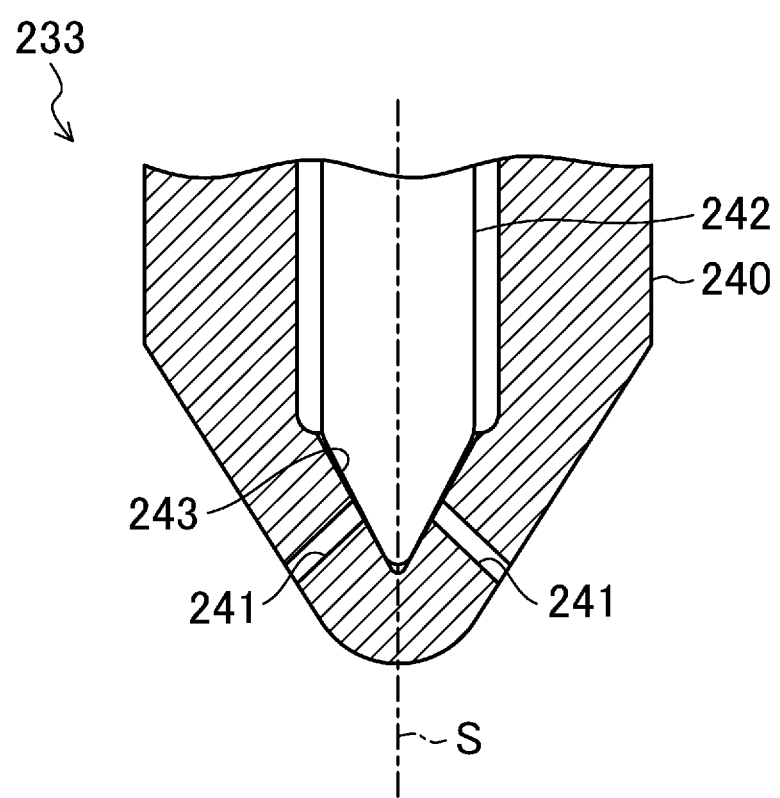
FIG. 14 is a cross-sectional view illustrating an internal structure of an injector according to another embodiment.

The structure of the injector is not limited to the structure described in the above embodiments. Any injector may be used as long as its effective cross-sectional area can be changed. For example, the injector may be valve covered orifice (VCO) nozzle type injector 233 as illustrated in FIG. 14. FIG. 14 is a cross-sectional view showing the internal structure of the injector 233.

Specifically, the injector 233 includes a nozzle body 240 having a nozzle port 241 from which fuel is injected into the cylinder 11, and a needle valve 242 which opens and closes the nozzle port 241. The nozzle body 240 is a tubular member extending along a predetermined central axis S, and the fuel flows through the inside of the nozzle body 240. The tip portion of the nozzle body 240 is formed into a cone shape. A bowl-shaped seat portion 243 is formed at the inner periphery of the tip portion of the nozzle body 240. The tip portion of the nozzle body 240 is provided with a plurality of nozzle ports 241 which pass through the tip portion. One end of each of the nozzle ports 241 is open at the seat portion 243. The nozzle ports 241 are equally spaced apart from each other around the central axis S. The tip portion of the needle valve 242 is formed into a cone shape, and is set on a seat portion 243 of the nozzle body 240. The nozzle ports 241 are closed when the needle valve 242 is set on the seat portion 243. The nozzle ports 241 are an example nozzle hole, and the needle valve 242 is an example valve element.

The needle valve 242 is operated by a piezoelectric element, similarly to the injector 33. Once the needle valve 242 is operated and lifted from the seat portion 243, a gap is formed between the seat portion 243 and the needle valve 242, allowing the fuel to pass therethrough. The fuel passing through the gap is injected outside of the nozzle body 240 through the nozzle port 241.

When the fuel passes through, cavitation occurs at the inner periphery of the nozzle port 241. The degree of the cavitation (e.g., the size of the area where the cavitation occurs) varies according to the gap between the needle valve 242 and the seat portion 243, i.e., the lift amount of the needle valve 242. Specifically, the area where the cavitation occurs increases when the lift amount of the needle valve 242 is small and the gap between the needle valve 242 and the seat portion 243 is small. On the other hand, the area where the cavitation occurs decreases when the lift amount of the needle valve 242 is large and the gap between the needle valve 242 and the seat portion 243 is large. If the area where the cavitation occurs is large, the effective cross-sectional area of the nozzle port 241 decreases. If the area where the cavitation occurs is small, the effective cross-sectional area of the nozzle port 241 increases. That is, the smaller the lift amount of the needle valve 242 is, the smaller the effective cross-sectional area of the nozzle port 241 becomes, and the larger the lift amount of the needle valve 242 is, the larger the effective cross-sectional area of the nozzle port 241 becomes.

In the above embodiments, the shape of the air-fuel mixture layer in the combustion chamber 17 can be changed by changing the lift amount of the injector 33 and the fuel injection intervals. In addition to this, an increase in the fuel pressure further increases the variations in the shape of the air-fuel mixture layer associated with the change in the lift amount of the injector 33 and the fuel injection intervals. That is, an increased fuel pressure leads to a further increase in the kinetic energy of the fuel spray when the lift amount of the injector 33 is increased, and leads to a higher degree of the negative pressure when the fuel injection interval is shortened, thereby further increasing the negative pressure region. As a result, the variations in the shape of the air-fuel mixture layer are further increased.

The above examples adopt the heat insulating structures of the combustion chamber 17 and the intake port 18, as well as the heat-insulating layer made of a gas layer in the cylinder (i.e., in the combustion chamber 17). However, the techniques disclosed herein are applicable to an engine that does not adopt the heat insulating structures of the combustion chamber 17 and the intake port 18.

Further, according to the fuel injection techniques disclosed herein, the air-fuel mixture layer and the gas layer around the air-fuel mixture layer are formed in the combustion chamber 17. However, the techniques are not limited thereto. The above fuel injection techniques are also applicable to the case in which a gas layer is not present and an air-fuel mixture layer contacts with the wall surfaces of the combustion chamber 17. For example, if the fuel injection amount increases with respect to the capacity of the combustion chamber 17, the air-fuel mixture layer may contact with the wall surfaces of the combustion chamber 17. Even in such a case, heat dissipation from the wall surfaces of the combustion chamber 17, and hence the cooling loss, can be reduced by enhancing heat generation near the center of the combustion chamber 17, and reducing heat generation near the wall surfaces of the combustion chamber 17.

In the above examples, the fuel injection timing is set to a period from the second half of a compression stroke to an initial period of an expansion stroke. This is to reduce the spread of the fuel spray by injecting the fuel into high-pressure atmosphere in the cylinder 11 in which the pressure is more than or equal to a predetermined pressure. In a turbocharged engine, for example, the fuel may be injected in a period from an initial period of the second half of the compression stroke to the end of the compression stroke.

DESCRIPTION OF REFERENCE CHARACTERS 1 engine
11 cylinder
15 piston
15a cavity
15b wall surface of cavity
17 combustion chamber
33 injector
40 nozzle body
41 nozzle port (nozzle hole)
42 outwardly-opening valve (valve element)
8, 801 first injection group (first injection mode)
9 second injection group (second injection mode)
100 engine controller (control section)
233 injector
241 nozzle port (nozzle hole)
242 needle valve (valve element)
S central axis
X central axis of cylinder

The invention claimed is:

1. A device for controlling a direct injection gasoline engine, comprising:
 an engine body which has a piston in a cylinder and of which a combustion chamber is defined by the cylinder and the piston;
 an injector configured to inject a fuel containing at least gasoline into the combustion chamber through a nozzle hole; and
 a control section configured to control a fuel injection amount to be injected into the combustion chamber, and an injection state of the injector, according to an operational state of the engine body, wherein
 the control section predicts a state of temperature in the combustion chamber, and instructs the injector to conduct a fuel injection with a larger effective cross-sectional area of the nozzle hole and/or a longer injection interval of the fuel such that a volume of an air-fuel mixture layer formed in the combustion chamber is larger when the predicted temperature is high, than when the predicted temperature is low, even when same fuel amounts are injected.

2. The device of claim 1, wherein
 the control section controls the injection state of the injector to increase the volume of the air-fuel mixture layer by increasing a width, which extends in a radial direction and intersects with a central axis of the cylinder, of the air-fuel mixture layer formed in the combustion chamber, while keeping a same length of the air-fuel mixture layer along the central axis of the cylinder.

3. The device of claim 1, wherein
the injector has a nozzle body provided with the nozzle hole, and a valve element which opens and closes the nozzle hole, and the injector is configured such that an effective cross-sectional area of the nozzle hole increases as a lift amount of the valve element increases.

4. The device of claim 3, wherein
the control section makes the injector carry out a multi-stage injection,
the multi-stage injection includes a first injection group performing fuel injections at a predetermined injection interval while setting the effective cross-sectional area of the nozzle hole at a predetermined value, and a second injection group performing fuel injections in which the effective cross-sectional area of the nozzle hole is smaller than that of the first injection group and/or the injection interval of the fuel is shorter than that of the first injection group, and
the control section makes the injector inject a larger amount of fuel through the first injection group, than an amount to be injected through the second injection group, when a temperature in the combustion chamber is high.

5. The device of claim 3, wherein
the control section is capable of switching between a first injection mode performing a plurality of fuel injections at a predetermined interval while setting the effective cross-sectional area of the nozzle hole at a predetermined value, and a second injection mode performing a plurality of fuel injections in which the effective cross-sectional area of the nozzle hole is smaller than that of the first injection mode and/or the injection interval of the fuel is shorter than that of the first injection mode, and
the control section makes the injector inject the fuel through the first injection mode when the temperature in the combustion chamber is high.

6. The device of claim 3, wherein
the control section makes the injector inject the fuel during a second half of a compression stroke, through a plurality of injection modes with different effective cross-sectional areas of the nozzle hole,
the plurality of injection modes include a first injection mode in which the effective cross-sectional area of the nozzle hole is set at a predetermined value, and a second injection mode in which the effective cross-sectional area of the nozzle hole is set at a smaller value than the predetermined value, and
the control section makes the injector inject a larger amount of fuel through the first injection mode, than an amount to be injected through the second injection mode, when a temperature in the combustion chamber is high.

7. The device of claim 1, wherein
the control section makes the injector inject the fuel when a pressure in the cylinder is more than or equal to a predetermined pressure to form, in the combustion chamber, the air-fuel mixture layer and a gas layer made of fresh air and/or burnt gas around the air-fuel mixture layer.

8. The device of claim 7, wherein
the control section makes the injector inject the fuel during a second half of a compression stroke to form the gas layer between the air-fuel mixture layer and a wall surface defining the combustion chamber at a time of ignition of an air-fuel mixture of the air-fuel mixture layer.

9. The device of claim 8, wherein
the wall surface of the combustion chamber is an inner wall surface of a recessed cavity formed in a top surface of the piston.

10. The device of claim 1, wherein
the control section determines an amount of fuel to be injected from the injector such that an air-fuel ratio, which is a proportion of weight of air in the cylinder to weight of the fuel to be injected, is greater than a stoichiometric air-fuel ratio and is lean, in forming the air-fuel mixture layer and a gas layer made of fresh air and/or burnt gas around the air-fuel mixture layer.

11. The device of claim 2, wherein
the injector has a nozzle body provided with the nozzle hole, and a valve element which opens and closes the nozzle hole, and the injector is configured such that an effective cross-sectional area of the nozzle hole increases as a lift amount of the valve element increases.

12. The device of claim 11, wherein
the control section makes the injector carry out a multi-stage injection,
the multi-stage injection includes a first injection group performing fuel injections at a predetermined injection interval while setting the effective cross-sectional area of the nozzle hole at a predetermined value, and a second injection group performing fuel injections in which the effective cross-sectional area of the nozzle hole is smaller than that of the first injection group and/or the injection interval of the fuel is shorter than that of the first injection group, and
the control section makes the injector inject a larger amount of fuel through the first injection group, than an amount to be injected through the second injection group, when a temperature in the combustion chamber is high.

13. The device of claim 11, wherein
the control section is capable of switching between a first injection mode performing a plurality of fuel injections at a predetermined interval while setting the effective cross-sectional area of the nozzle hole at a predetermined value, and a second injection mode performing a plurality of fuel injections in which the effective cross-sectional area of the nozzle hole is smaller than that of the first injection mode and/or the injection interval of the fuel is shorter than that of the first injection mode, and
the control section makes the injector inject the fuel through the first injection mode when the temperature in the combustion chamber is high.

14. The device of claim 11, wherein
the control section makes the injector inject the fuel during a second half of a compression stroke, through a plurality of injection modes with different effective cross-sectional areas of the nozzle hole,
the plurality of injection modes include a first injection mode in which the effective cross-sectional area of the nozzle hole is set at a predetermined value, and a second injection mode in which the effective cross-sectional area of the nozzle hole is set at a smaller value than the predetermined value, and the control section makes the injector inject a larger amount of fuel through the first injection mode, than an amount to be injected through the second injection mode, when a temperature in the combustion chamber is high.

15. The device of claim 2, wherein
the control section makes the injector inject the fuel when a pressure in the cylinder is more than or equal to a predetermined pressure to form, in the combustion chamber, the air-fuel mixture layer and a gas layer made of fresh air and/or burnt gas around the air-fuel mixture layer.

16. The device of claim 3, wherein
the control section makes the injector inject the fuel when a pressure in the cylinder is more than or equal to a predetermined pressure to form, in the combustion chamber, the air-fuel mixture layer and a gas layer made of fresh air and/or burnt gas around the air-fuel mixture layer.

17. The device of claim 4, wherein
the control section makes the injector inject the fuel when a pressure in the cylinder is more than or equal to a predetermined pressure to form, in the combustion chamber, the air-fuel mixture layer and a gas layer made of fresh air and/or burnt gas around the air-fuel mixture layer.

18. The device of claim 5, wherein
the control section makes the injector inject the fuel when a pressure in the cylinder is more than or equal to a predetermined pressure to form, in the combustion chamber, the air-fuel mixture layer and a gas layer made of fresh air and/or burnt gas around the air-fuel mixture layer.

19. The device of claim 6, wherein
the control section makes the injector inject the fuel when a pressure in the cylinder is more than or equal to a predetermined pressure to form, in the combustion chamber, the air-fuel mixture layer and a gas layer made of fresh air and/or burnt gas around the air-fuel mixture layer.

20. The device of claim 11, wherein
the control section makes the injector inject the fuel when a pressure in the cylinder is more than or equal to a predetermined pressure to form, in the combustion chamber, the air-fuel mixture layer and a gas layer made of fresh air and/or burnt gas around the air-fuel mixture layer.

21. The device of claim 12, wherein
the control section makes the injector inject the fuel when a pressure in the cylinder is more than or equal to a predetermined pressure to form, in the combustion chamber, the air-fuel mixture layer and a gas layer made of fresh air and/or burnt gas around the air-fuel mixture layer.

22. The device of claim 13, wherein
the control section makes the injector inject the fuel when a pressure in the cylinder is more than or equal to a predetermined pressure to form, in the combustion chamber, the air-fuel mixture layer and a gas layer made of fresh air and/or burnt gas around the air-fuel mixture layer.

23. The device of claim 14, wherein
the control section makes the injector inject the fuel when a pressure in the cylinder is more than or equal to a predetermined pressure to form, in the combustion chamber, the air-fuel mixture layer and a gas layer made of fresh air and/or burnt gas around the air-fuel mixture layer.

24. A device for controlling a direct injection gasoline engine, comprising:
an engine body which has a piston in a cylinder and of which a combustion chamber is defined by the cylinder and the piston;
an injector configured to inject a fuel containing at least gasoline into the combustion chamber through a nozzle hole; and
a control section configured to control a fuel injection amount to be injected into the combustion chamber, and an injection state of the injector, according to an operational state of the engine body, wherein
the injector has a nozzle body provided with the nozzle hole, and a valve element which opens and closes the nozzle hole, and the injector is configured such that an effective cross-sectional area of the nozzle hole increases as a lift amount of the valve element increases,
the control section makes the injector carry out a multi-stage injection, and
the control section predicts a state of temperature in the combustion chamber, and provides a larger average lift amount during the fuel injection by increasing an effective cross-sectional area of the nozzle hole of the injector and/or lengthening an injection interval of the fuel when the predicted temperature is high, than when the predicted temperature is low, even when same fuel amounts are injected.

25. The device of claim 24, wherein
the control section determines an amount of fuel to be injected from the injector such that an air-fuel ratio, which is a proportion of weight of air in the cylinder to weight of the fuel to be injected, is greater than a stoichiometric air-fuel ratio and is lean, in forming the air-fuel mixture layer and a gas layer made of fresh air and/or burnt gas around the air-fuel mixture layer.

* * * * *